US011959039B2

(12) United States Patent
Andoh et al.

(10) Patent No.: US 11,959,039 B2
(45) Date of Patent: Apr. 16, 2024

(54) HEATING DEVICE CONFIGURED TO LIMIT A TEMPERATURE RISE OF A LUBRICANT, FIXING DEVICE, AND IMAGE FORMING APPARATUS

(71) Applicants: Takayuki Andoh, Kanagawa (JP); Masahiro Samei, Kanagawa (JP); Kota Shiodera, Tokyo (JP); Toshiyuki Kabata, Kanagawa (JP); Hiroshi Yoshinaga, Chiba (JP)

(72) Inventors: Takayuki Andoh, Kanagawa (JP); Masahiro Samei, Kanagawa (JP); Kota Shiodera, Tokyo (JP); Toshiyuki Kabata, Kanagawa (JP); Hiroshi Yoshinaga, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/179,552

(22) Filed: Mar. 7, 2023

(65) Prior Publication Data

US 2023/0300269 A1 Sep. 21, 2023

(30) Foreign Application Priority Data

Mar. 16, 2022 (JP) ................................ 2022-041406
Nov. 21, 2022 (JP) ................................ 2022-185656

(51) Int. Cl.
*H04N 1/00* (2006.01)
*C10M 107/50* (2006.01)
*G03G 15/20* (2006.01)

(52) U.S. Cl.
CPC ....... *C10M 107/50* (2013.01); *G03G 15/2017* (2013.01); *G03G 15/2025* (2013.01); *G03G 15/2039* (2013.01)

(58) Field of Classification Search
None
See application file for complete search history.

(56) References Cited

U.S. PATENT DOCUMENTS 11,714,369 B2 * 8/2023 Kikuchi ............. G03G 15/2042 358/471
2007/0002346 A1 * 1/2007 Nakane .................... H04N 1/56 358/1.9

(Continued)

FOREIGN PATENT DOCUMENTS

JP 07-028356 A * 1/1995
JP H07-028356 A 1/1995

(Continued)

OTHER PUBLICATIONS

Extended European Search Report dated Aug. 18, 2023 issued in corresponding European Application No. 23161201.1.

(Continued)

*Primary Examiner* — Miya J Cato
*Assistant Examiner* — Pawan Dhingra
(74) *Attorney, Agent, or Firm* — Harness, Dickey & Pierce, P.L.C.

(57) ABSTRACT

A heating device includes a rotating body, a heating source, a rotating body holder, and a lubricant of liquid or semi-solid. The heating source heats the rotating body. The rotating body holder holds both longitudinal ends of the rotating body rotatably. The lubricant of liquid or semi-solid adheres to the rotating body holder. A temperature of the rotating body holder is lower than a generation temperature of fine particles of the lubricant.

20 Claims, 21 Drawing Sheets

(56) References Cited

U.S. PATENT DOCUMENTS

| | | | | |
|---|---|---|---|---|
| 2007/0196152 | A1* | 8/2007 | Shimizu | G03G 15/6573 399/405 |
| 2010/0196066 | A1* | 8/2010 | Tamemasa | G03G 15/2025 399/329 |
| 2011/0044734 | A1* | 2/2011 | Shimokawa | G03G 15/2053 399/324 |
| 2011/0052245 | A1* | 3/2011 | Shinshi | G03G 15/2025 399/92 |
| 2011/0064437 | A1* | 3/2011 | Yamashina | G03G 15/205 399/329 |
| 2011/0222875 | A1* | 9/2011 | Imada | G03G 15/2025 399/33 |
| 2011/0222888 | A1* | 9/2011 | Ikebuchi | G03G 15/2039 399/329 |
| 2011/0222931 | A1* | 9/2011 | Shinshi | G03G 15/2064 399/329 |
| 2011/0274453 | A1* | 11/2011 | Shimokawa | G03G 15/2064 399/329 |
| 2012/0177388 | A1* | 7/2012 | Imada | G03G 15/2064 399/329 |
| 2013/0045032 | A1* | 2/2013 | Shimokawa | G03G 15/2053 399/329 |
| 2013/0164056 | A1* | 6/2013 | Imada | G03G 15/2064 399/329 |
| 2013/0183072 | A1* | 7/2013 | Hase | G03G 15/2053 399/329 |
| 2013/0195523 | A1* | 8/2013 | Yamaji | G03G 15/2053 399/329 |
| 2013/0209147 | A1* | 8/2013 | Ogawa | G03G 15/2053 399/329 |
| 2014/0072355 | A1* | 3/2014 | Tamaki | G03G 15/2017 399/329 |
| 2014/0341623 | A1* | 11/2014 | Arai | G03G 15/2053 399/329 |
| 2014/0341627 | A1* | 11/2014 | Yoshikawa | G03G 15/2053 399/329 |
| 2017/0185015 | A1* | 6/2017 | Yoshinaga | G03G 15/2039 |
| 2018/0024462 | A1* | 1/2018 | Shimada | G03G 15/051 399/92 |
| 2018/0267449 | A1* | 9/2018 | Naitoh | G03G 15/2025 |
| 2019/0388824 | A1* | 12/2019 | Mansour | B01J 20/18 |
| 2020/0050144 | A1* | 2/2020 | Kabata | G03G 21/206 |
| 2020/0133176 | A1* | 4/2020 | Yoshiura | G03G 15/2053 |
| 2022/0026834 | A1* | 1/2022 | Yoshinaga | G03G 15/2017 |
| 2023/0016128 | A1* | 1/2023 | Kikuchi | G03G 15/2039 |

FOREIGN PATENT DOCUMENTS

| | | | |
|---|---|---|---|
| JP | 2013-164430 | 8/2013 | |
| JP | 2013-164453 | 8/2013 | |
| JP | 2013-164473 | 8/2013 | |
| JP | 2014-056007 | 3/2014 | |
| JP | 2014-056016 | 3/2014 | |
| JP | 2014-240945 | 12/2014 | |
| JP | 2015-069026 | 4/2015 | |
| JP | 2015-203719 | 11/2015 | |
| WO | WO-2021/011028 A1 | 1/2021 | |
| WO | WO-2021011028 A1 * | 1/2021 | B41J 29/377 |

OTHER PUBLICATIONS

U.S. Appl. No. 18/162,872, filed Feb. 1, 2023, Hiroshi Yoshinaga, et al.

U.S. Appl. No. 18/160,080, filed Jan. 26, 2023, Daisuke Inoue, et al.

U.S. Appl. No. 18/163,591, filed Feb. 2, 2023, Takayuki Andoh et al.

* cited by examiner

HEATING DEVICE CONFIGURED TO LIMIT A TEMPERATURE RISE OF A LUBRICANT, FIXING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-041406, filed on Mar. 16, 2022, and 2022-185656, filed on Nov. 21, 2022, in the Japan Patent Office, the entire disclosure of each of which is hereby incorporated by reference herein.

BACKGROUND

Technical Field

Embodiments of the present disclosure generally relate to a heating device, a fixing device, and an image forming apparatus.

Related Art

As examples of a heating device mounted in an image forming apparatus such as a copier or a printer, there is known a fixing device for heating a recording medium such as sheet paper to fix, on the recording medium, an unfixed image on the recording medium.

In such a fixing device, to reduce the sliding resistance generated between a rotating body such as a belt and a member such as a nip forming member and a belt holder that slide relative to the rotating body, a substance having lubricity such as oil or grease (hereinafter referred to as "lubricant") is generally used. The substance having lubricity refers to a substance interposed between components to reduce the frictional resistance between such components.

In overseas countries, in particular, in Europe, there is a high level of concern about the environment, and in the image forming apparatus such as a copier, a multifunction peripheral, and a printer using electrophotography processing, there are various certification standards for a volatile organic compound (VOC), ozone, dust, fine particles, and the like generated during image formation. In particular, a research institute of the German government introduces an eco-label system called "Blue Angel Mark", and allows such a label to be used only in a certified product and service.

Even products not certified with the "Blue Angel Mark" are not prohibited from being sold, but not being certified is often perceived as a product not environmentally friendly, and such a tendency is particularly strong in public offices. Therefore, the presence or absence of the "Blue Angel Mark" certification has a significant impact on product sales.

There are various tests to be passed to obtain the "Blue Angel Mark" certification, and the fine particle test is particularly strict. Specifically, it is required that the number of fine particles obtained when fine particles of 5.6 nm to 560 nm generated from an image forming apparatus are measured by a particle measurement apparatus FMPS (Fast Mobility Particle Sizer) desirably is less than $3.5\times10^{11}$ pieces/10 minutes, and it is expected that the standard values will become even stricter in the future. The number of fine particles in such a case is not affected by a type and a state, for example, inorganic matter/organic matter, or solid/liquid (mist) of the substance forming the fine particles. Only a size and the number of fine particles are relevant.

It is said that the fine particles generated from various members included in the image forming apparatus, but when only the fixing device is activated, an amount of generated fine particles increases significantly, and thus, the fixing device is found to be a major source of generation of the fine particles. In fact, when the aforementioned lubricant is heated to a high temperature, the fine particles are detected, and therefore, the lubricant is one source of generation of the fine particles. It is believed that heating the lubricant to a high temperature causes a very small portion of the components of the lubricant to volatilize as a high-temperature gas, and thereafter, such a gas is cooled and condensed, and finally, the fine particles are generated. There is a need to prevent the lubricant from being exposed to a high temperature environment and to suppress the generation of fine particles from the image forming apparatus.

SUMMARY

According to an embodiment of the present disclosure, a heating device includes a rotating body, a heating source, a rotating body holder, and a lubricant of liquid or semi-solid. The heating source heats the rotating body. The rotating body holder holds both longitudinal ends of the rotating body rotatably. The lubricant of liquid or semi-solid adheres to the rotating body holder. A temperature of the rotating body holder is lower than a generation temperature of fine particles of the lubricant.

According to another embodiment of the present disclosure, a fixing device includes the heating device. The heating device heats a recording medium bearing an unfixed image to fix the unfixed image on the recording medium.

According to still another embodiment of the present disclosure, an image forming apparatus includes the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
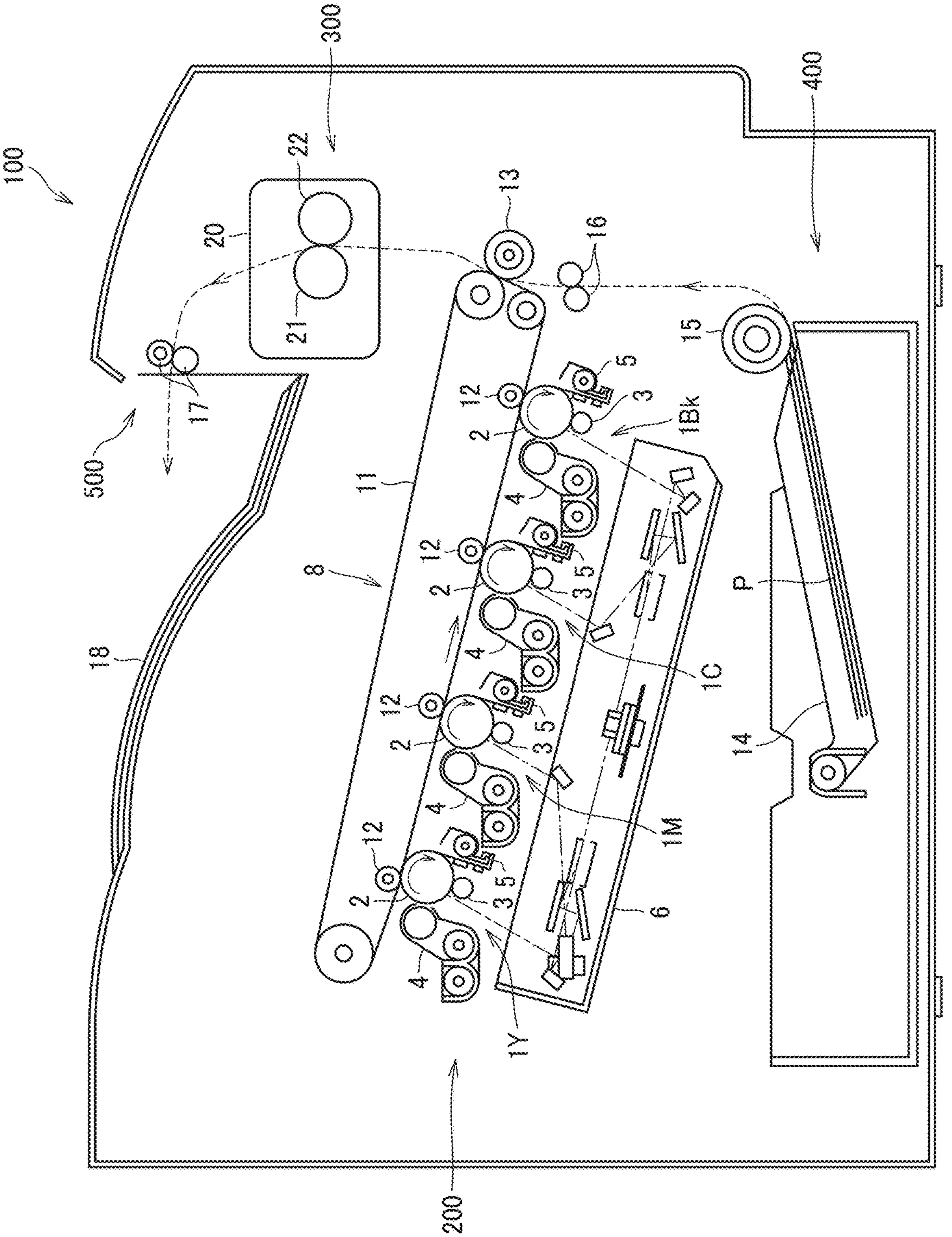
FIG. 1 is a schematic view of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The present disclosure will be described below with reference to the accompanying drawings. In each figure illustrating the present disclosure, a component such as a member and a part having the same function or shape is assigned the same reference numeral as long as the component is identified, and once explained, a redundant description thereof will be omitted.

FIG. 1 is a schematic view of a configuration of an image forming apparatus according to an embodiment of the present disclosure. Here, the "image forming apparatus" as used herein includes a printer, a copier, a facsimile, a printing machine, or a multifunction peripheral combining two or more thereof. The term "image formation" as used in the following description indicates not only to form a meaningful image such as a character and a figure, but also to form a meaningless image such as a pattern. Firstly, with reference to FIG. 1, an overall configuration and operation of the image forming apparatus according to the present embodiment will be described.

As illustrated in FIG. 1, an image forming apparatus 100 according to the present embodiment includes an image forming unit 200 that forms an image on a sheet-like recording medium such as sheet paper, a fixing unit 300 that fixes an image on the recording medium, a recording medium supply unit 400 that supplies the recording medium to the image forming unit 200, and a recording medium ejection unit 500 that ejects the recording medium to the outside of the image forming apparatus 100.

The image forming unit 200 includes four process units 1Y, 1M, 1C, and 1Bk as image formation units, an exposure device 6 that forms an electrostatic latent image on a photoconductor 2 provided in each of the process units 1Y, 1M, 1C, and 1Bk, and a transfer device 8 that transfers the image onto the recording medium.

Each of the process units 1Y, 1M, 1C, and 1Bk is basically configured in much the same way except that different color toners (developers) of yellow, magenta, cyan, and black corresponding to color separation components of a color image are accommodated. Specifically, each of the process units 1Y, 1M, 1C, and 1Bk includes a photoconductor 2 as an image bearer that carries the image on a surface of the photoconductor 2, a charging member 3 that charges the surface of the photoconductor 2, a developing device 4 that supplies a toner as a developer to the surface of the photoconductor 2 to form a toner image, and a cleaning member 5 that cleans the surface of the photoconductor 2.

The transfer device 8 includes an intermediate transfer belt 11, a primary transfer roller 12, and a secondary transfer roller 13. The intermediate transfer belt 11 is an endless belt member stretched by a plurality of support rollers. The primary transfer roller 12 includes four primary transfer rollers 12 arranged inside the intermediate transfer belt 11.

When each the primary transfer rollers 12 contacts each photoconductor 2 via the intermediate transfer belt 11, a primary transfer nip is formed between the intermediate transfer belt 11 and each photoconductor 2. The secondary transfer roller 13 contacts an outer peripheral surface of the intermediate transfer belt 11 to form a secondary transfer nip.

The fixing unit 300 includes a fixing device 20 as a heating device that heats the recording medium on which the image is transferred. The fixing device 20 includes a fixing belt 21 that heats the image on the recording medium, a pressure roller 22 that contacts the fixing belt 21 to form a nip portion (fixing nip), etc.

The recording medium supply unit 400 includes a sheet feeding cassette 14 in which the sheet paper P as the recording medium is accommodated, and a sheet feeding roller 15 that feeds the sheet paper P from the sheet feeding cassette 14. The "recording medium" is hereinafter described as a "sheet paper", but is not limited to paper (sheet paper). Examples of the "recording medium" include, but are not limited to, the paper (sheet paper), an overhead projector (OHP) sheet or fabric, a metal sheet, a plastic film, or a prepreg sheet obtained by previously impregnating a carbon fiber with resin. Examples of the "sheet paper" include, but are not limited to, plain paper, thick paper, a postcard, an envelope, a thin paper, a coated paper (coated paper, art paper, and the like), and tracing paper.

The recording medium ejection unit 500 includes a pair of sheet ejection rollers 17 that eject the sheet paper P to the outside of the image forming apparatus, and a sheet ejection tray 18 on which the sheet paper P ejected by the sheet ejection rollers 17 is placed.

Next, with reference to FIG. 1, a printing operation of the image forming apparatus 100 according to the present embodiment will be described.

When the printing operation is started in the image forming apparatus 100, the photoconductor 2 of each of the process units 1Y, 1M, 1C, and 1Bk and the intermediate transfer belt 11 of the transfer device 8 start rotating. The sheet feeding roller 15 starts rotating to feed the sheet paper P from the sheet feeding cassette 14. When the fed sheet paper P contacts a pair of timing roller 16, the feeding of the sheet paper P is stopped, and conveyance of the sheet paper P is temporarily halted until the image transferred to the sheet paper P is formed.

In each of the process units 1Y, 1M, 1C, and 1Bk, firstly, the charging member 3 uniformly charges a surface of the photoconductor 2 to a high potential. Next, based on image information of a document ready by a document reading device, or printed-image information to which a printing instruction is applied from a terminal, the exposure device 6 exposes the surface (charged surface) of each photoconductor 2. As a result, a potential of an exposed portion decreases, and an electrostatic latent image is formed on the surface of each photoconductor 2. The developing device 4 supplies the toner to the electrostatic latent image to form a toner image on each photoconductor 2. When the toner image formed on each photoconductor 2 reaches the primary transfer nip (position of the primary transfer roller 12) as each photoconductor 2 rotates, each toner image is transferred sequentially, on top of one another, onto the rotating intermediate transfer belt 11. As a result, a full-color toner image is formed on the intermediate transfer belt 11. It is noted that one of the respective process units 1Y, 1M, 1C, and 1Bk may be used to form a monochrome image, or any two or three of the process units 1Y, 1M, 1C, and 1Bk may be used to form a two-color or three-color image. After the toner image is transferred to the intermediate transfer belt 11, the cleaning member 5 removes a residual toner and the like on each photoconductor 2.

Along with rotation of the intermediate transfer belt 11, the toner image transferred onto the intermediate transfer belt 11 is conveyed to the secondary transfer nip (position of the secondary transfer roller 13), and is transferred onto the sheet paper P conveyed by the timing rollers 16. Thereafter, the sheet paper P is conveyed to the fixing device 20, and the toner image on the sheet paper P is heated and pressed by the fixing belt 21 and the pressure roller 22 to fix the toner image on the sheet paper P. Next, the sheet paper P is conveyed to the recording medium ejection unit 500 and ejected to the sheet ejection tray 18 by the sheet ejection rollers 17. Thus, a series of printing operations is completed.

Figure 2:
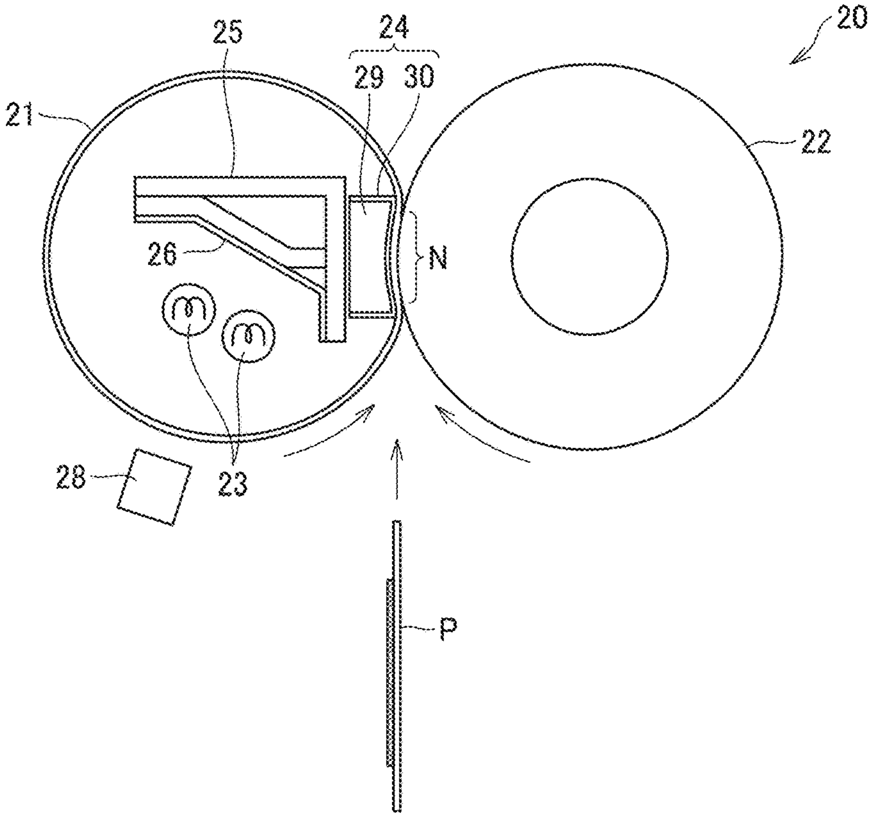
FIG. 2 is a cross-sectional view of a central portion of a fixing device according to a first embodiment of the present disclosure.

Next, with reference to FIG. 2 and FIG. 3, a basic configuration of the fixing device according to the present embodiment will be described. FIG. 2 is a cross-sectional view of a central portion of the fixing device obtained when the fixing device according to the present embodiment is cut at a longitudinal central portion M of the fixing belt 21 (see FIG. 3). The term "longitudinal direction" of the fixing belt as used here is a direction indicated by an arrow X in FIG. 3, and means the same direction as a rotation axis direction of the pressure roller 22 or a width direction of the sheet paper Passing between the fixing belt 21 and the pressure roller 22 (nip portion) (direction intersecting a sheet conveyance direction). The term "longitudinal direction" in the following description has the same meaning.

Figure 3:
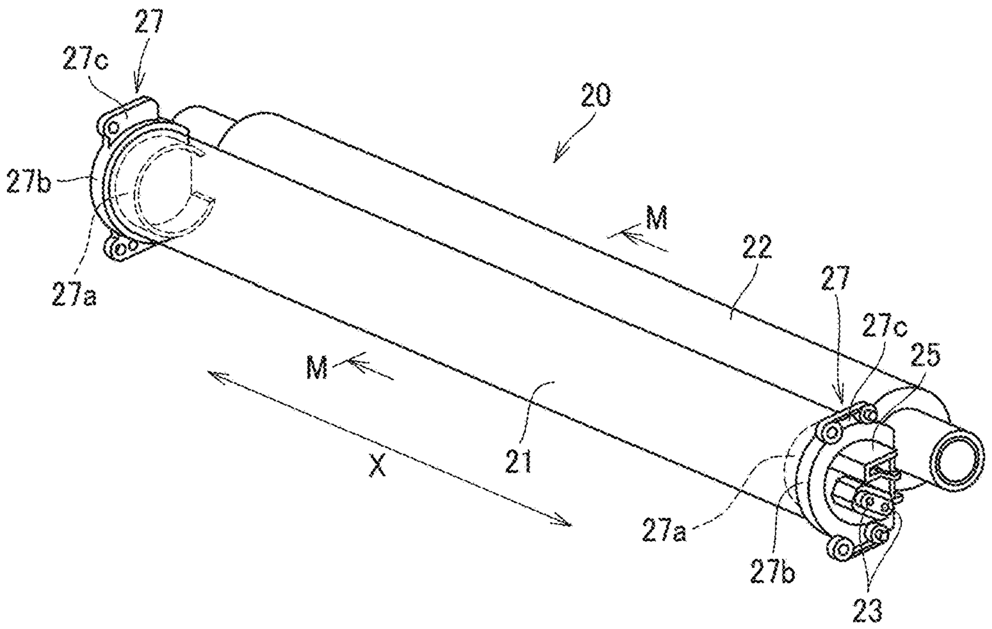
FIG. 3 is a perspective view of the fixing device according to the first embodiment.

As illustrated in FIG. 2 and FIG. 3, the fixing device 20 according to the present embodiment includes not only the fixing belt 21 and the pressure roller 22, but also a heater 23, a nip forming member 24, a stay 25, a reflecting member 26 (see FIG. 2), a belt holder 27 (see FIG. 3), and a temperature sensor 28 (see FIG. 2).

The fixing belt 21 is a rotating body (a first rotating body or a fixing member) that contacts an unfixed toner carrying surface of the sheet paper P to fix an unfixed toner (unfixed image) on the sheet paper P.

Specifically, the fixing belt 21 includes an endless belt in which a base material, an elastic layer, and a release layer are laminated in order from an inner peripheral surface side to an outer peripheral surface side. The base material has a layer thickness of from 30 to 50 μm inclusive, and includes a metal material such as nickel or stainless steel or a resin material such as polyimide. The elastic layer has a layer thickness of from 100 to 300 μm inclusive and includes a rubber material such as silicone rubber, foamed silicone rubber, or fluororubber. When the fixing belt 21 includes an elastic layer, minute irregularities are not formed on a surface of the fixing belt 21 in the nip portion, and thus, heat is more likely to be evenly transferred to the toner image on the sheet paper P. The release layer has a layer thickness of from 10 to 50 μm inclusive, and includes a material such as PFA (tetrafluoroethylene-perfluoroalkyl vinyl ether copolymer), PTFE (polytetrafluoroethylene), polyimide, polyetherimide, and PES (polyether sulfide). When the fixing belt 21 includes the release layer, it is possible to retain a releasability (peeling property) for the toner (toner image). The fixing belt 21 preferably has an overall thickness of 1 mm or less and a diameter of 30 mm or less for miniaturization and low heat capacity.

The pressure roller 22 is a rotating body (a second rotating body or an opposing member) arranged to face the outer peripheral surface of the fixing belt 21.

Specifically, the pressure roller 22 includes a solid iron core material, an elastic layer provided on the outer peripheral surface of the core material, and a release layer provided on the outer peripheral surface of the elastic layer. The core material may be a hollow member.

The elastic layer includes silicone rubber, foamed silicone rubber, or fluororubber, for example. The release layer includes fluororesin such as PFA or PTFE.

The heater 23 is a heating source that heats the fixing belt 21. A halogen heater is used as the heater 23 in the present embodiment. In addition to the halogen heater, the heater 23 may be other radiant heaters such as carbon heaters or ceramic heaters, or may be a heating source of an electromagnetic induction heating system. In the present embodiment, the heater 23 includes two heaters 23 arranged inside the fixing belt 21, but the number of heaters 23 may be one, or three or more.

The nip forming member 24 is arranged inside the fixing belt 21, and is a member that receives pressure from the pressure roller 22 to form a nip portion N between the fixing belt 21 and the pressure roller 22. The nip forming member 24 includes a base pad 29 and a sliding sheet 30.

The base pad 29 is arranged continuously in a longitudinal direction X of the fixing belt 21 and fixed to the stay 25. As a result of the base pad 29 receiving the pressure from the pressure roller 22, a shape of the nip portion N is determined. As a material of the base pad 29, a heat-resistant member having a heat resistance temperature of 200° C. or more is preferably used. Examples of such a material include, but are not limited to a general heat resistant resin such as polyethersulfone (PES), polyphenylene sulfide (PPS), liquid crystal polymer (LCP), polyethernitrile (PEN), polyamideimide (PAI), or polyetheretherketone (PEEK). When such a heat-resistant material is used as the material of the base pad 29, it is possible to prevent thermal deformation of the base pad 29 in a fixing temperature range and stabilize the shape of the nip portion N. The shape of the nip portion N may be a concave shape as illustrated in FIG. 2, a flat shape, or other shapes.

The sliding sheet 30 is a low-friction member interposed between the base pad 29 and the inner peripheral surface of the fixing belt 21. The sliding sheet 30 is interposed between the base pad 29 and the fixing belt 21, and thus, the sliding resistance of the fixing belt 21 against the base pad 29 is reduced. If the base pad 29 is formed of a low-friction member, a configuration without the sliding sheet 30 may be used.

The stay 25 is a supporting member that supports the nip forming member 24 from a side opposite to the pressure roller 22. When the nip forming member 24 is supported by the stay 25, bending of the nip forming member 24 due to the pressure of the pressure roller 22 (in particular, bending in the longitudinal direction of the fixing belt 21) is suppressed. As a result, it is possible to obtain the nip portion N having a uniform width. As a material of the stay 25, an iron-based metal material such as stainless steel (SUS) or steel electrolytic cold commercial (SECC) is preferable to ensure rigidity.

The reflecting member 26 is a member that reflects radiant heat (infrared rays) radiated from the heater 23. When the radiant heat emitted from the heater 23 is reflected to the fixing belt 21 by the reflecting member 26, the fixing belt 21 is efficiently heated. The reflecting member 26 is interposed between the stay 25 and the heater 23 and also serves a function of suppressing a heat transfer to the stay 25. As a result, it is possible to prevent a flow of heat to members not directly contributing to fixing, and thus, it is possible to realize efficient energy consumption. As a material of the reflecting member 26, it is possible to use a metal material such as aluminum or stainless steel. In particular, when the reflecting member 26 includes vapor-depositing silver having a high reflectance, on a surface of a base material including aluminum, heating efficiency is further improved.

The belt holder 27 is a pair of rotating body holders that rotatably hold the fixing belt 21. As illustrated in FIG. 3, the belt holder 27 includes the belt holders 27 inserted at both longitudinal ends of the fixing belt 21 to rotatably hold the fixing belt 21 from the inside. It is noted that the "both longitudinal ends" of the fixing belt 21 as used here and the "longitudinal end" of the fixing belt 21 as used in the following description are not limited to a case where only the outermost end edge in the longitudinal direction of the fixing belt 21 is indicated. The "both longitudinal ends" and the "longitudinal end" include the outermost end edge in the longitudinal direction of the fixing belt 21, and any position within a range of one-third length from the end edge when the fixing belt 21 is divided into three equal parts in the longitudinal direction. Therefore, the belt holder 27 may hold an area (longitudinal end) including the outermost end edge in the longitudinal direction of the fixing belt 21, and may hold an area (longitudinal end) not including the end edge of the fixing belt 21.

Specifically, the belt holder 27 includes an insertion portion 27*a* having a C-shaped cross section inserted into the longitudinal end of the fixing belt 21, a restriction portion 27*b* formed on an outer diameter larger than an outer diameter of the insertion portion 27*a*, and a fixed portion 27*c* fixed to a side plate described later. The restriction portion 27*b* is formed larger than at least the outer diameter of the fixing belt 21, and regulates deviation of the fixing belt 21 in a longitudinal direction X (movement in the longitudinal direction) if such deviation is generated. The insertion portion 27*a* is inserted into the longitudinal end of the fixing belt 21 to rotatably hold the fixing belt 21 from the inside.

The temperature sensor 28 is a temperature detection member that detects a temperature of the fixing belt 21. In the present embodiment, as the temperature sensor 28, a non-contact temperature sensor arranged in a non-contact manner with respect to an outer peripheral surface of the fixing belt 21, is used. In such a case, the temperature sensor 28 detects an ambient temperature near the outer peripheral surface of the fixing belt 21 as a surface temperature of the fixing belt 21. The temperature sensor 28 is not limited to a non-contact sensor, and may be a contact sensor that detects the surface temperature by contacting the fixing belt 21. Examples of the temperature sensor 28 may include a well-known temperature sensor such as a thermopile, thermostat, thermistor or NC sensor.

The fixing device 20 according to the present embodiment operates as follows.

When the pressure roller 22 rotates in a direction indicated by an arrow in FIG. 2 by being driven by a drive source provided in a main body of the image forming apparatus 100, the fixing belt 21 rotates to follow the rotation of the pressure roller 22. The heater 23 generates heat, and the fixing belt 21 is heated by the heater 23. At this time, when an amount of heat generated by the heater 23 is controlled based on the temperature of the fixing belt 21 detected by the temperature sensor 28, the temperature of the fixing belt 21 is controlled to a predetermined fixing temperature (temperature at which image fixing is possible). Next, in a state where the temperature of the fixing belt 21 reaches the fixing temperature, when the sheet paper P carrying an unfixed image is conveyed between the fixing belt 21 and the pressure roller 22 (nip portion N), the sheet paper P is heated and pressed by the fixing belt 21 and the pressure roller 22 to fix the image on the sheet paper P onto the sheet paper P.

Here, in the fixing device including the nip forming member 24 as described above, the fixing belt 21 slides against the nip forming member 24 when the fixing belt 21 rotates, and thus, a sliding resistance is generated between the fixing belt 21 and the nip forming member 24. To reduce the sliding resistance at this time, a lubricant such as silicone oil, silicone grease, fluorine grease, and fluorine oil is applied to be provided between the fixing belt 21 and the nip forming member 24, in general. The lubricant is contained in, for example, the sliding sheet 30 (see FIG. 2) arranged between the base pad 29 of the nip forming member 24 and the inner peripheral surface of the fixing belt 21, and when the lubricant seeps out from the sliding sheet 30, the lubricant is provided between the nip forming member 24 and the fixing belt 21.

In the configuration in which the fixing belt 21 is held by the pair of belt holders 27 as described above, the fixing belt 21 slides on each belt holder 27 when the fixing belt 21 rotates. At this time, a sliding resistance occurs also between each belt holder 27 and the fixing belt 21, and therefore, to reduce the sliding resistance, the above-described lubricant is provided also between each belt holder 27 and the fixing belt 21.

Thus, in the configuration including the sliding members such as the nip forming member 24 and the belt holder 27, to improve the slidability of the fixing belt 21, a lubricant such as silicone oil, silicone grease, fluorine grease, and fluorine oil are generally used. However, along with the temperature rise of the fixing device, some of the low-molecular-weight components of the lubricant volatilize, and when such components aggregate by being cooled in the atmosphere, fine particles are generated, and thus, the fine particles may be emitted from the fixing device. As used here, the "fine particles" are fine particles and ultrafine particles (hereinafter referred to as "FPs/UFPs") measured under a measurement condition for examining the relationship illustrated in FIG. 34 described later, and are particles having a particle diameter of from 5.6 nm to 560 nm inclusive.

In recent years, due to the growing awareness of environmental issues, measures to suppress the generation of FPs/UFPs emitted from products are desired, and in the image forming apparatus, there is a demand for the development of an apparatus that generates less FPs/UFPs.

Therefore, in considering the measures to suppress the generation of FPs/UFPs from the fixing device, the present inventor and others firstly conducted a test to investigate the relationship between the temperature rise of silicone oil and fluorine grease used as a lubricant and the concentration of FPs/UFPs generated from such a lubricant (the number of FPs/UFPs generated per 1 $cm^3$). The results are illustrated in FIG. 34.

During the test, in a 1-cubic meter chamber conforming to Japanese Industrial Standards (JIS) A 1901 (ventilation frequency: 5 times), a liquid or semi-solid lubricating substance in a sample container was heated. As illustrated in FIG. 35, a sample container 1000 obtained by forming a recess **1000*a* having a diameter of 22 mm and a depth of 2 mm, in an aluminum plate of 50 mm×50 mm×5 mm, was used, and a sample was placed in the recess 1000*a*. The sample container 1000 containing the sample was placed on a hot plate of a heating device (clean hot plate MH-180CS manufactured by AS ONE Corporation, controller MH-3CS manufactured by AS ONE Corporation), and the sample was heated at a set temperature of 250° C. While the temperature of the hot plate was being monitored, the number concentration of FPs/UFPs in the chamber was measured by using a measuring device (fast-response particle sizer FMPS: Fast Mobility Particle Sizer, TSI; Model 3091) (Use Averaging Interval at the time of Export: 30 seconds). Fluorine grease and silicone oil were used as a lubricant, and the sample amount was set to 36 μl. A solid line in FIG. 34 indicates the number concentration of FPs/UFPs generated from the fluorine grease, and a dashed-dotted line in FIG. 34 indicates the number concentration of FPs/UFPs generated from the silicone oil. In FIG. 34**, while the horizontal axis indicates the temperature of the hot plate, the temperature rise of the hot plate and the temperature rise of the lubricant change almost synchronously, and thus, in such a case, the temperature of the hot plate is regarded as the temperature of the lubricant.

Figure 34:
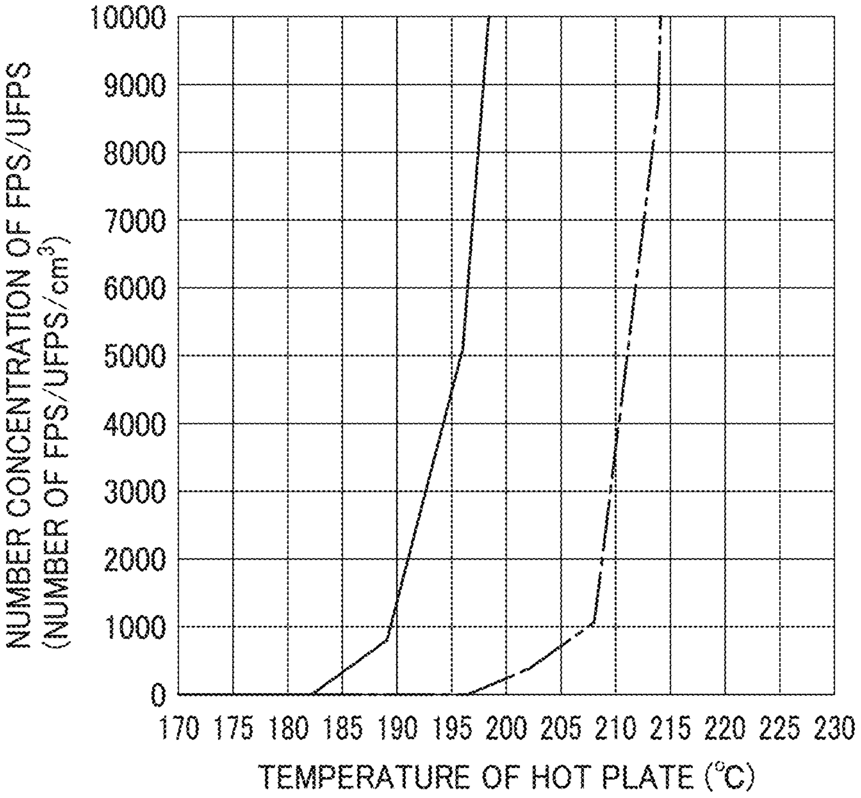
FIG. 34 is a graph illustrating a relationship between temperature of lubricant and concentration of generated fine particles.
Figure 35:
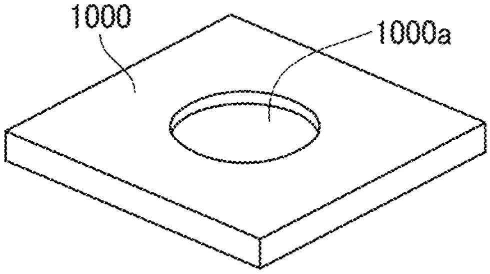
FIG. 35 is a perspective view of a sample container.

As illustrated in FIG. 34, in the fluorine grease indicated by the solid line, FPs/UFPs started to generate when the temperature reaches about 185° C., and when the temperature reached or exceeded 194° C., the number concentration of FPs/UFPs generated sharply increased. On the other hand, in the silicone oil indicated by the dashed-dotted line, FPs/UFPs started to generate when the temperature reached about 200° C., and when the temperature reached or exceeded 210° C., the number concentration of FPs/UFPs generated sharply increased. The temperature at which the concentration sharply increased is defined as a fine particle generation temperature, and was considered a temperature at which the number concentration of FPs/UFPs in the chamber was 4000/cm3 or more.

Thus, judging from the findings that in the fluorine grease, FPs/UFPs occurred when the temperature reached 185° C. and in the silicone oil, FPs/UFPs occurred when the temperature reached 200° C., in a fixing device in which a temperature exceeds 200° C., FPs/UFPs may be generated from the lubricant. Therefore, to effectively reduce such FPs/UFPs, it is important to suppress the temperature rise in a portion where FPs/UFPs is likely to occur.

However, it has not been possible to specify until now from which part of the fixing device the FPs/UFPs is most often generated. Therefore, the present inventors and others conducted extensive studies on the main sources of FPs/UFPs, and as a result, found that a large amount of FPs/UFPs was mainly generated from the lubricant adhering to the belt holder. The reason for and the mechanism of such generation will be described below.

Figure 36:
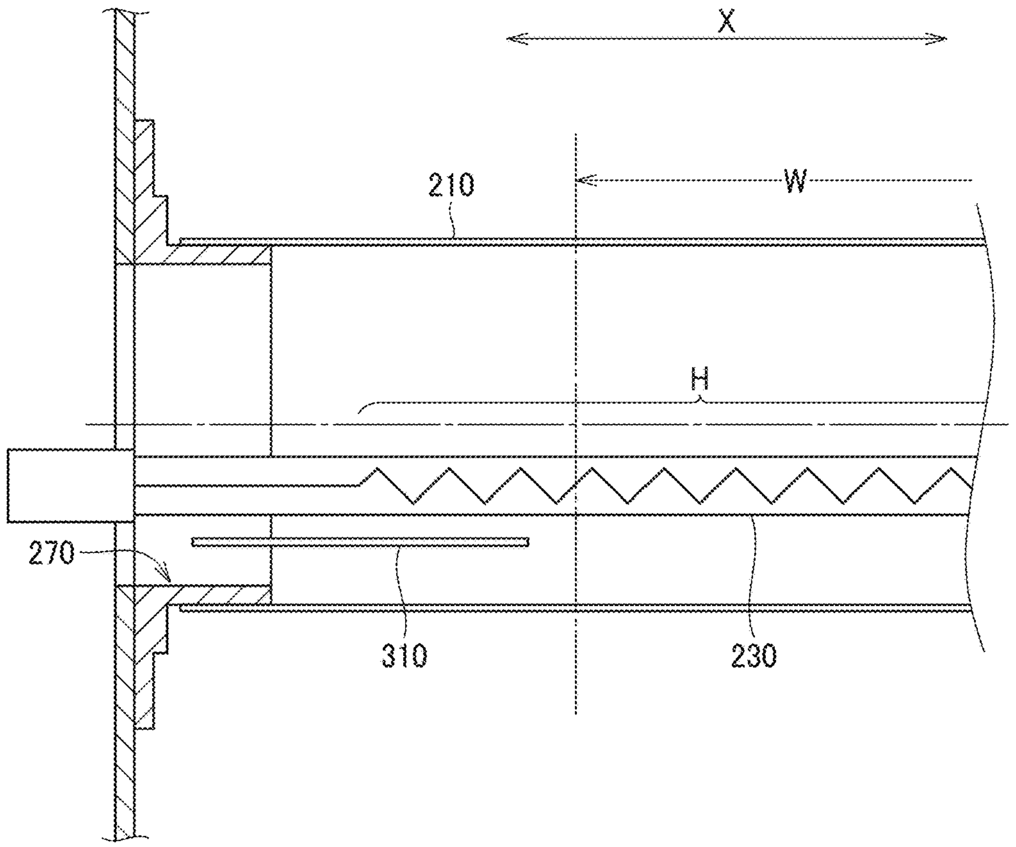
FIG. 36 is a cross-sectional view of a fixing device according to a comparative example, cut along a longitudinal direction of a fixing belt.

FIG. 36 is a cross-sectional view of the configuration of a longitudinal end of a fixing belt in a fixing device of a comparative example.

As illustrated in FIG. 36, the fixing device of the comparative example includes the belt holder 270 that holds a longitudinal end of a fixing belt 210, as in the fixing device according to the embodiment of the present disclosure. An outer peripheral surface of the belt holder 270 is applied with a lubricant to reduce the sliding resistance of the fixing belt 210. It is noted that even if the lubricant is not actively applied to the outer peripheral surface of the belt holder 270, when the lubricant provided between the fixing belt and the nip forming member flows along with rotation of the fixing belt, the lubricant may adhere to the outer peripheral surface of the belt holder 270.

Here, in the fixing device of the comparative example, if a plurality of sheets are continuously fed and fixing processing is performed continuously, in a non-sheet-feeding area outside a maximum sheet-feeding area (maximum recording medium passing area) W through which sheet paper having a maximum width passes, heat associated with sheet paper feeding is less likely to be consumed, and thus, the temperature of the fixing belt 210 rises due to heat accumulation. Next, when the heat of such a fixing belt 210 is transmitted to the belt holder 270 that holds the longitudinal end of the fixing belt 210, the temperature of the belt holder 270 rises under the influence of the heat of the fixing belt 210. As illustrated in FIG. 36, in the configuration in which a heat generation portion H of a heater 230 extends to the outside of the maximum sheet-feeding area W, the temperature rise of the fixing belt 210 in the non-sheet-feeding area appears to be more pronounced, and thus, the temperature rise of the belt holder 270 also tends to be remarkable. Thus, in the fixing device of the comparative example, along with the temperature rise at the longitudinal end portion, that is, the non-sheet-feeding area of the fixing belt 210, the temperature of the belt holder 270 that holds the longitudinal end portion may rise excessively, and thus, as illustrated in FIG. 36, measures to suppress the temperature rise may be introduced by including a shield 310 in the fixing belt 210. The shield 310 includes a plurality of shields 310 provided between the heater 230 and the fixing belt 210 and between the heater 230 and the belt holder 270 in the non-sheet-feeding area to shield radiant heat from the heater 230 to the fixing belt 210 and the belt holder 270.

However, the shield 310 directly receives the radiant heat emitted from the heater 230 and becomes hot, and thus, it has been found that the temperature rise of the shield 310 causes the temperature rise of the belt holder 270. In particular, in a small fixing device, the fixing belt 210 has a small diameter, and thus, the shield 310 and the belt holder 270 are close to each other, and as a result, the belt holder 270 is in an environment susceptible to the heat of the shield 310. If the temperature of the belt holder 270 exceeds the temperature at which FPs/UFPs occurs as described above due to the influence of the heat of such a shield 310 and the influence of the heat in the non-sheet-feeding area of the fixing belt 210, the temperature of the lubricant adhering to the belt holder 270 rises, and as a result, FPs/UFPs is generated from the lubricant. Thus, in the fixing device of the comparative example, it is not possible to effectively suppress the temperature rise of the belt holder 270, and thus, FPs/UFPs may be generated from the lubricant along with the temperature rise of the belt holder 270.

Figure 37:
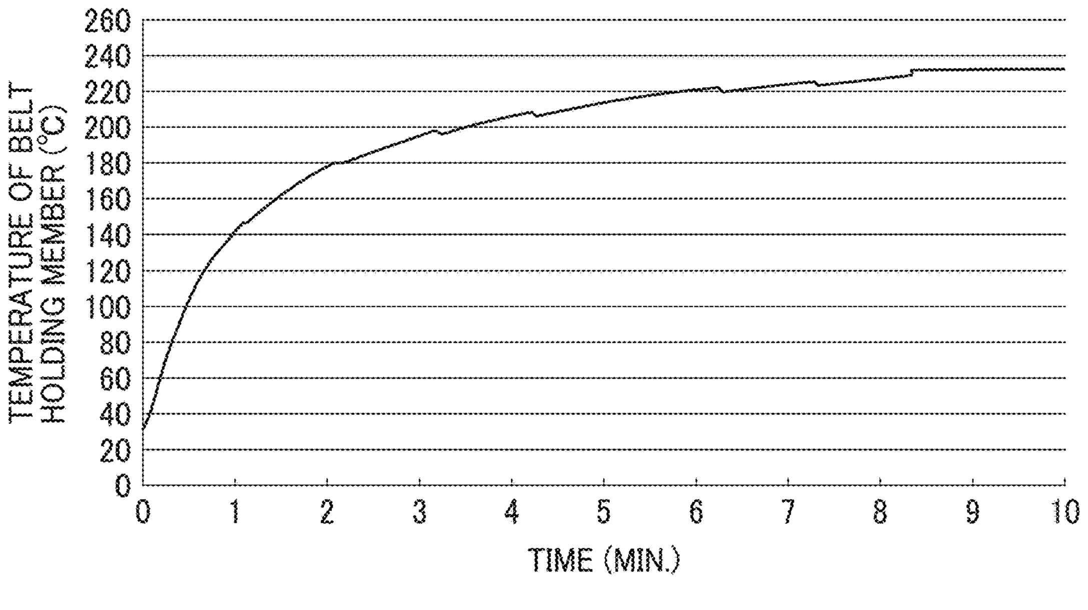
FIG. 37 is a graph illustrating temperature rise of a belt holder in a comparative example.

Therefore, the present inventors of the present disclosure conducted a test to investigate the generation speed of FPs/UFPs (the number of FPs/UFPs generated per unit time) in the fixing device of the comparative example. FIG. 37 illustrates the temperature rise of the belt holder when fixing processing is performed while a sheet is continuously fed for 10 minutes by using the fixing device of the comparative example, and FIG. 38 illustrates the generation speed at which FPs/UFPs occurs from the fixing device of the comparative example during 10 minutes of such continuous sheet feeding.

Firstly, the temperature rise of the belt holder illustrated in FIG. 37 will be described. Such a temperature rise is a result of measuring the temperature of the belt holder during 10 minutes of the continuous sheet feeding by using a thermocouple.

According to the results illustrated in FIG. 37, in the fixing device of the comparative example, when about three minutes passed after the start of the continuous sheet feeding, the temperature of the belt holder exceeded 210° C., which was the temperature at which FPs/UFPs derived from silicone oil increases sharply, and when 10 minutes passed, the temperature rose to 235° C. At this time, the temperature of the shield had risen to 340° C. As described above, from the results illustrated in FIG. 37, it was found that in the fixing device of the comparative example, due to the high temperature of the shield, the temperature of the belt holder might exceed the FPs/UFPs generation temperature under the influence of the heat of the shield.

Figure 38:
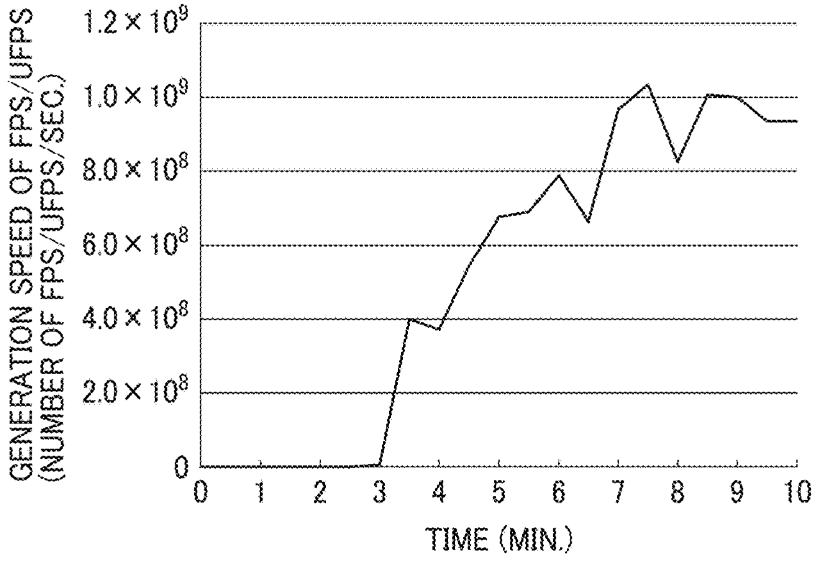
FIG. 38 is a graph illustrating generation speed of fine particles in a comparative example.

Next, FIG. 38 illustrates measurement results of the generation speed of FPs/UFPs (the number of FPs/UFPs generated per one second), which are obtained by setting the image forming apparatus including the fixing device of the comparative example in a test room (chamber with a volume of 2.18 m3) and continuously feeding the sheet paper for 10 minutes and outputting such sheet paper in a blank state. At this time, the printing speed during the continuous sheet feeding was set to 60 ppm (Page Per Minutes). A reason why the sheet paper is output in a blank state is to prevent FPs/UFPs generated from wax in the toner and the like from being included in the measurement target. The object to be measured was FPs/UFPs having a particle diameter of from 5.6 [nm] to 560 [nm] inclusive defined in the Blue Angel standards.

As can be seen from FIG. 38, in the image forming apparatus including the fixing device of the comparative example, when about three minutes passed after the temperature of the belt holder exceeded 200° C. (see FIG. 37), FPs/UFPs began to occur, and thereafter, along with a further rise of the temperature of the belt holder, the number of FPs/UFPs generated (generation speed) also increased. As a result, the number of FPs/UFPs generated in 10 minutes exceeded $4.0\times10^{11}$.

As described above, from the test results illustrated in FIGS. 37 and 38, in the fixing device and the image forming apparatus including the fixing device of the comparative example, it was found that when the fixing device was operated for 10 minutes and the sheet paper was continuously fed, the number of FPs/UFPs generated significantly increased along with the temperature rise of the belt holder. From such a finding, it can be said that the lubricant adhering to the belt holder is the source of the FPs/UFPs. Therefore, to effectively reduce the number of FPs/UFPs ejected from the fixing device, it is important to suppress the temperature rise of the belt holder and to suppress the temperature rise of the lubricant adhering to the belt holder.

Therefore, in the embodiment of the present disclosure, the following measures are introduced to suppress the temperature rise of the belt holder.

Figure 4:
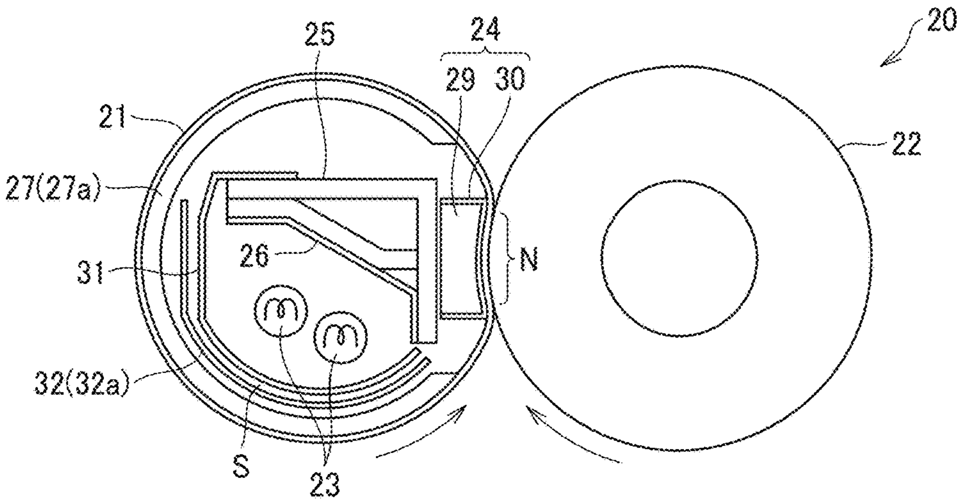
FIG. 4 is a cross-sectional view of an end of the fixing device according to the first embodiment.
Figure 5:
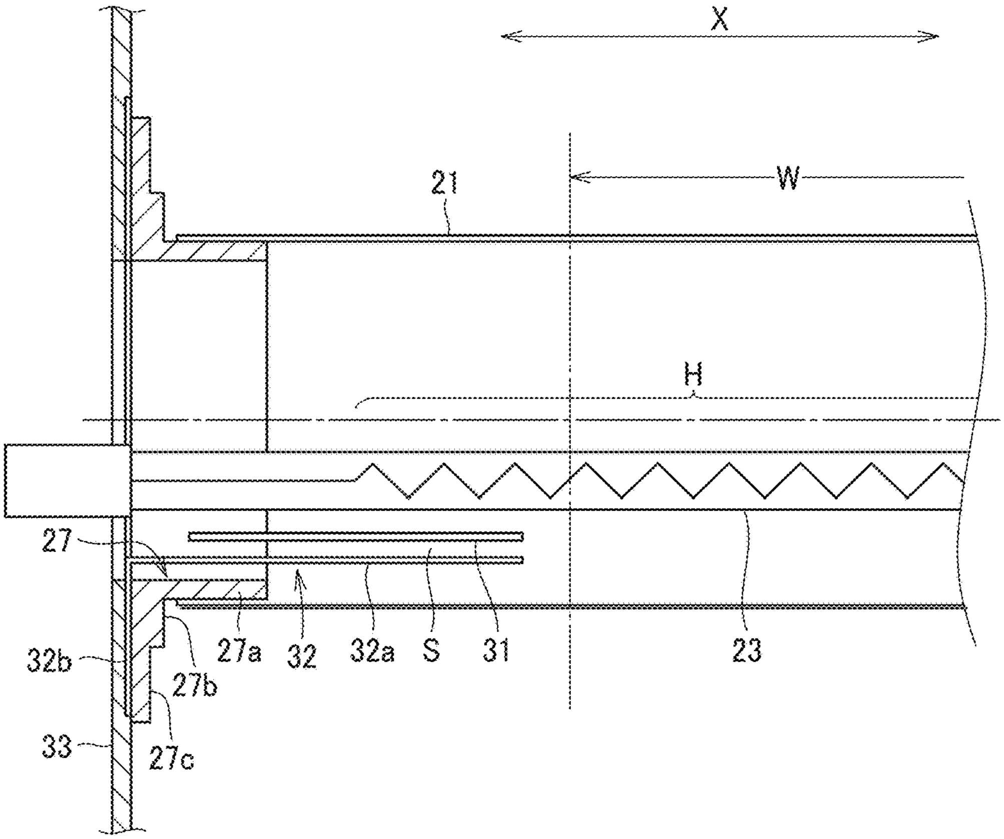
FIG. 5 is a cross-sectional view of an end of the fixing device according to the first embodiment, cut along a longitudinal direction of a fixing belt.

FIG. 4 is a cross-sectional view of an end of the fixing device according to an embodiment of the present disclosure, cut at an end of the fixing belt in the longitudinal direction. FIG. 5 is a cross-sectional view of an end of the fixing device according to the present embodiment, cut along the longitudinal direction of the fixing belt.

As illustrated in FIGS. 4 and 5, similarly to the fixing device of the comparative example illustrated in FIG. 36, the fixing device 20 according to the present embodiment includes a shield 31 between the heater 23 and the belt holder 27. A configuration and a function of such a shield 31 are basically the same as the configuration and the function of the shield 310 illustrated in FIG. 36. Supplementally, the shield 31 is fixed to the stay 25 and formed in an arc shape along the inner peripheral surface of the fixing belt 21.

Here, if the shield 31 is referred to as "first shield" for convenience, in the present embodiment, a second shield 32, which is another shield, is provided between the first shield 31 and the belt holder 27. In FIG. 4 and FIG. 5, only a configuration at one end side in the longitudinal direction X of the fixing belt 21 is illustrated, and similarly, at the other end side, in addition to the first shield 31, the second shield 32 is arranged.

Figure 6:
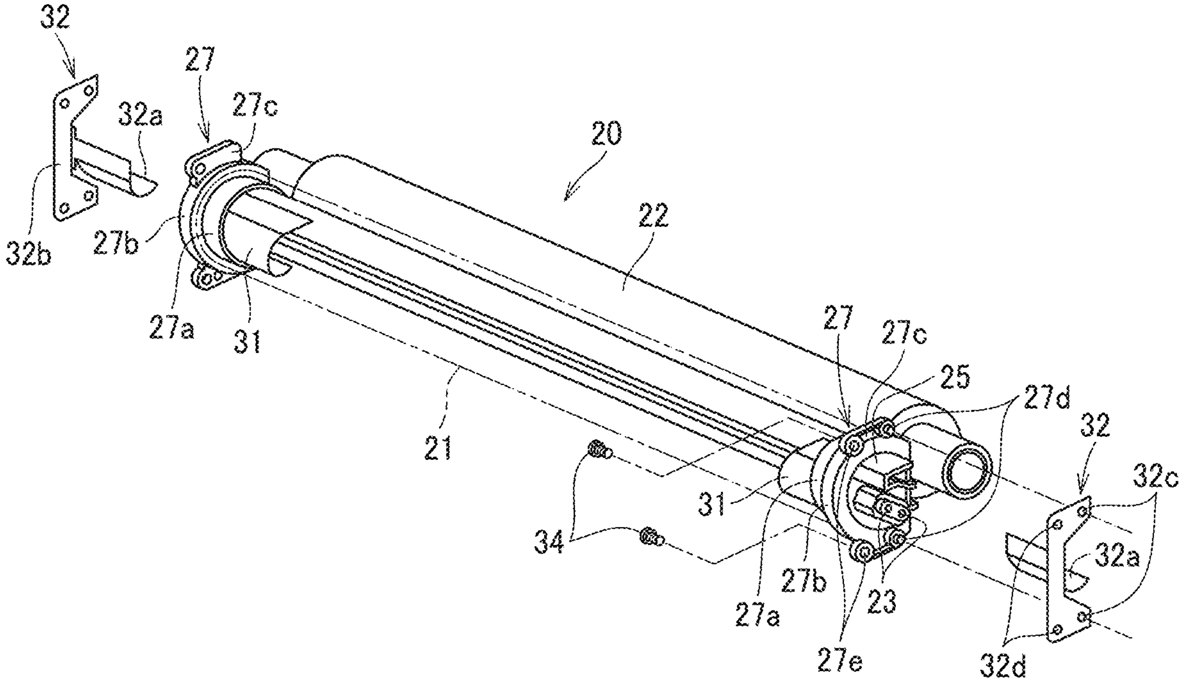
FIG. 6 is a perspective view of second shields, illustrating the mounting structure of the second shields.

The second shield 32 includes a shielding portion 32*a* formed in an arc shape along the inner peripheral surface of the fixing belt 21, and an attachment portion 32*b* attached to be sandwiched between belt holder 27 and a side plate 33 (see FIG. 5). As illustrated in FIG. 6, the attachment portion 32*b* is provided with hole portions 32*c* as engagement portions that engage with convex portions 27*d* provided on the fixed portion 27*c* of the belt holder 27. When the convex portions 27*d* of the belt holder 27 are inserted into the hole portions 32*c*, the second shield 32 is attached to the belt holder 27. When screws 34 are inserted into corresponding screw insertion holes 27*e* and 32*d* provided in the fixed portion 27*c* of the belt holder 27 and the second shield 32, the screws 34 are fastened to the side plate 33 to fix the second shield 32 to be sandwiched between the belt holder 27 and the side plate 33.

The first shield 31 includes a stainless steel plate, and shields the radiant heat (infrared rays) emitted from the heater 23 to the belt holder 27 to suppress heat transfer to the belt holder 27. On the other hand, the second shield 32 includes a copper plate having a higher thermal conductivity than the first shield 31, and shields the transfer of the heat from the first shield 31 to the belt holder 27, releases the received heat to the side plate 33 to suppress the heat transfer to the belt holder 27. In particular, in the present embodiment, the side plate 33 includes a metal material having a higher thermal conductivity than the belt holder 27 including a heat-resistant resin material, and thus, it is possible to effectively release the heat of the second shield 32 to the side plate 33.

Thus, both the first shield 31 and the second shield 32 function as heat transfer suppression members that suppress the heat transfer from the heater 23 to the belt holder 27. As a result, it is possible to effectively prevent the heat transfer to the belt holder 27 and possible to prevent the temperature rise of the belt holder 27 in a more advanced manner.

Figure 7:
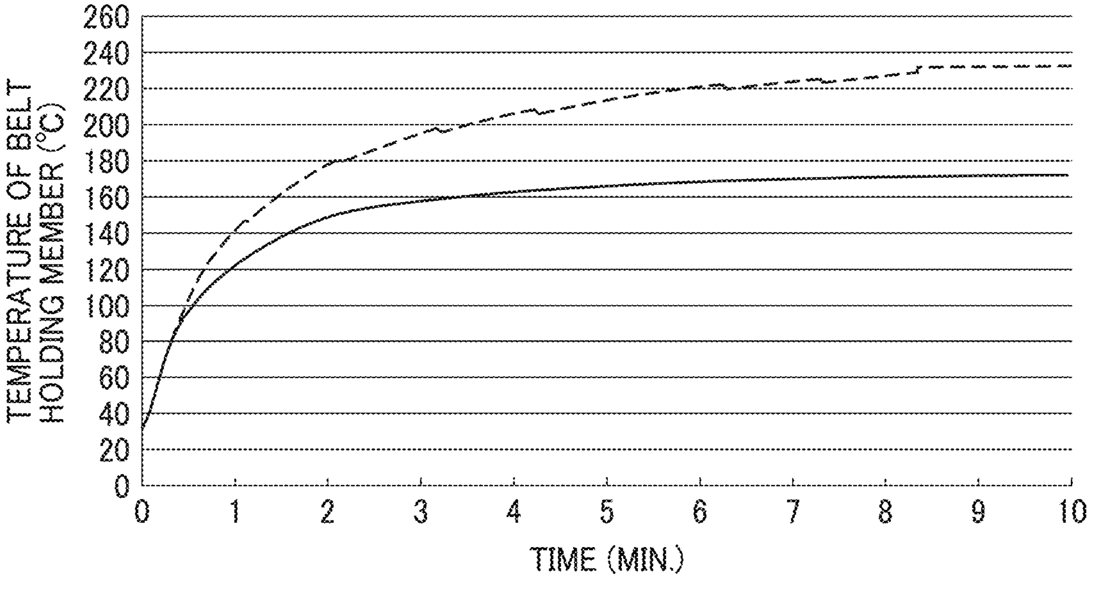
FIG. 7 is a graph illustrating a comparison of temperature rise of a belt holder between the first embodiment and a comparative example.
Figure 8:
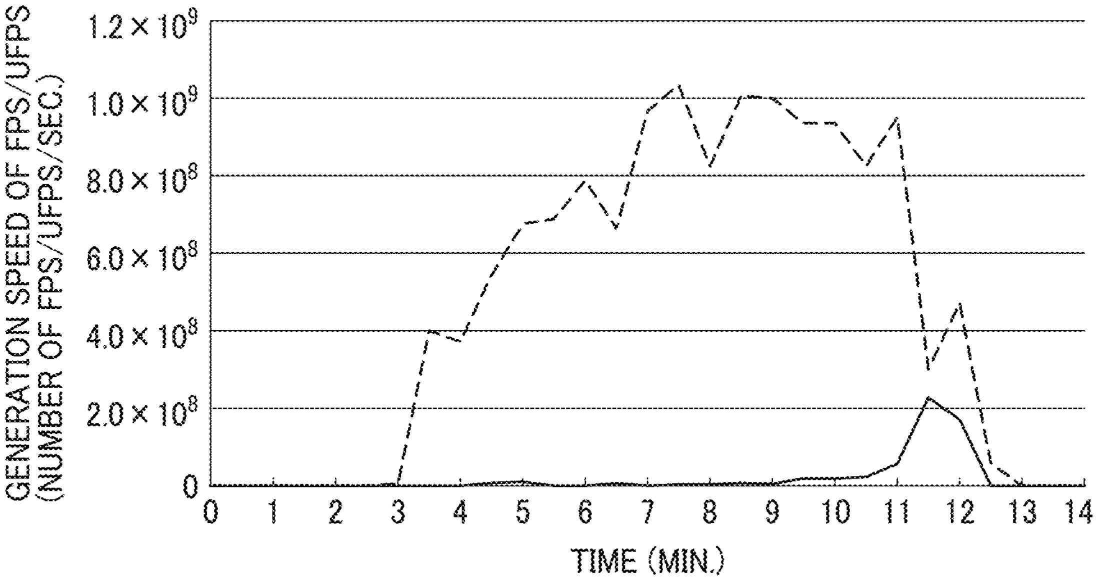
FIG. 8 is a graph illustrating a comparison of generation speed of fine particles between the first embodiment and a comparative example.

FIG. 7 illustrates the temperature rise of the belt holder during 10 minutes of the continuous sheet feeding when the fixing device according to the present embodiment is used to continuously feed the sheet. FIG. 8 illustrates the generation speed of FPs/UFPs (the number of FFPs/UFPs generated per unit time) during such a period. In FIG. 7 and FIG. 8, a solid line is a result of the present embodiment, and a dashed line is a result of the comparative example illustrated for comparison. It is noted that the conditions for carrying out the present test are the same as the test conditions for the fixing device of the comparative example illustrated in FIG. 37 and FIG. 38 as described above.

As can be seen from FIG. 7, in the present embodiment, the temperature rise of the belt holder was significantly suppressed successfully compared with the comparative example. In the comparative example, the temperature of the belt holder exceeded 210° C., which is the temperature at which FPs/UFPs derived from silicone oil increases sharply, and in the present embodiment, the temperature of the belt holder did not exceed 210° C. Further, in the present embodiment, the temperature of the belt holder did not exceed 194° C. at which the number of FPs/UFPs derived from fluorine grease increases sharply.

Therefore, as illustrated in FIG. 8, in the present embodiment, the generation of FPs/UFPs was successfully suppressed effectively as compared with the comparative example. In the comparative example, FPs/UFPs started to generate after about three minutes passed since the sheet feeding started, and thereafter, the number of FPs/UFPs generated (generation speed) further increased, however, in the present embodiment, the generation of FPs/UFPs was effectively suppressed successfully even after three minutes passed from the start of the sheet feeding.

Figure 9:
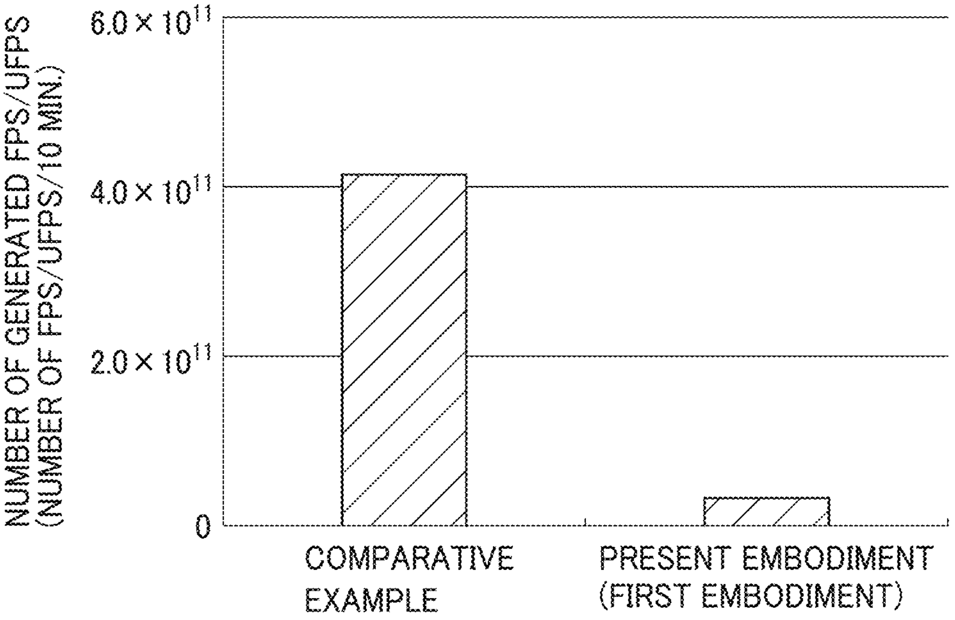
FIG. 9 is a graph illustrating a comparison of the number of generated fine particles between the first embodiment and a comparative example.

FIG. 9 is a graph illustrating a comparison of the number of fine particles (FPs/UFPs) generated (cumulative number) between the present embodiment and the comparative example, it can be also seen from the results illustrated in FIG. 9 that the number of FPs/UFPs generated was significantly reduced successfully in the present embodiment as compared with the comparative example.

As described above, in the present embodiment, the fixing device includes, as a means (heat transfer suppression member) that suppresses the temperature rise of the belt holder, in addition to the first shield 31 (first heat transfer suppression member) arranged between the heater 23 and the belt holder 27, the second shield 32 (second heat transfer suppression member) arranged between the first shield 31 and the belt holder 27, and thus, it is possible to suppress the temperature of the belt holder during continuous printing for 10 minutes, to 210° C. or less at which the silicone oil-derived FPs/UFPs rapidly increases. As a result, according to the fixing device of the present embodiment, it is possible to significantly reduce the number of FPs/UFPs generated from silicone oil as compared to the comparative example.

From the viewpoint of more reliably reducing the FPs/UFPs generated from the lubricant on the belt holder, the temperature of the belt holder during which the printing is performed is preferably lower than the generation temperature of FPs/UFPs of the lubricant on the belt holder. In general, the use of the image forming apparatus in the market is limited to continuous printing within several minutes in most cases, and continuous printing for five minutes or more is rarely performed. Therefore, to suppress the generation of FPs/UFPs, it suffices that the temperature of the belt holder during continuous printing for 10 minutes is set lower than the generation temperature of FPs/UFPs of the lubricant on the belt holder.

To more effectively suppress the generation of FPs/UFPs derived from silicone oil, it is preferable to suppress the temperature of the belt holder during continuous printing for 10 minutes, to 200° C. or less which is a temperature at which the silicone oil-derived FPs/UFPs generate. If the temperature of the belt holder is suppressed to 194° C. or less during continuous printing for 10 minutes, it is possible to suppress the generation of FPs/UFPs derived from fluorine grease. Further, if the temperature of the belt holder is suppressed to 185° C. or less during continuous printing for 10 minutes, it is possible to more effectively suppress the generation of FPs/UFPs derived from fluorine grease. If silicone grease is used instead of silicone oil, the same effect is successfully obtained by controlling the temperature of the belt holder as in the case of the silicone oil. If fluorine oil is used instead of fluorine grease, the same effect is successfully obtained by controlling the temperature of the belt holder as in the case of the fluorine grease.

Here, the "temperature of the belt holder during continuous printing for 10 minutes" means a temperature of the belt holder measured by the following procedure. In such a temperature measurement procedure, firstly, an image forming apparatus including a fixing device (heating device) is placed in a measurement room under an environment of 23° C., the power of the image forming apparatus is turned on for a start-up, and thereafter, after a waiting time (60 minutes, for example) passes, a print instruction is applied. In the printing condition, a default printing speed is set, and the fastest printing speed mode is set. Sheet paper used is the sheet paper of A4 size or a letter size having a basis weight of 70 g/m2, and if horizontal sheet feeding is selectable, such feeding is used, and if not, vertical sheet feeding is selected. Here, "horizontal sheet feeding" means that the sheet paper is conveyed with a long side thereof placed in a direction perpendicular to a conveying direction, and "vertical sheet feeding" means that the sheet paper is conveyed with a short side thereof placed in the direction perpendicular to the conveying direction. The temperature of the belt holder is measured with a thermocouple for 10 minutes from the start of printing when the first sheet paper is ejected. However, if a continuous printable time is 10 minutes or less due to the capacity of the sheet ejection tray or the sheet feeding tray, the temperature of the belt holder is measured during a possible continuous printable time. In addition to the measurement method specified above, the measurement may be performed using an apparatus and a condition conforming to the Blue Angel fine particle standards.

The fixing device according to the present embodiment includes the following configuration to effectively suppress the temperature rise of the belt holder.

Specifically, as illustrated in FIGS. 4 and 5, a gap S is provided between the shielding portion 32*a* of the second shield 32 and the first shield 31. Therefore, even if the first shield 31 is heated by the heater 23 and the temperature rises, the heat of the first shield 31 is not easily transferred to the second shield 32 due to a heat insulating effect of an air layer (gap S) between the first shield 31 and the second shield 32. As a result, the temperature of the second shield 32 is less likely to rise, so the temperature rise of the belt holder 27 is successfully suppressed effectively.

It is preferable that the gap S is provided over at least a range over which a heat generation portion H of the heater 23 in the longitudinal direction X of the fixing belt 21 is arranged. It is noted that the "heat generation portion" of the heater 23 in the present embodiment indicates a portion where heat of tungsten wire accommodated in a glass tube of a halogen heater is mainly generated, and specifically, a portion around which a tungsten wire is wound. Strictly speaking, even in a straight-line portion around which no tungsten wire is wound, the heat is slightly generated when energization is applied, but such a portion not considered a main heat generation source is not included in the heat generation portion.

In the range where the heat generation portion H of the heater 23 is arranged, the first shield 31 directly receives the radiant heat emitted from the heater 23 to experience the temperature rise, and thus, in the range over which the heat generation portion H is arranged, it is preferable that the first shield 31 and the second shield 32 are arranged with the gap S arranged therebetween (in a non-contact manner). As a result, it is possible to effectively suppress the transfer of the heat from the first shield 31 to the second shield 32, and it is also possible to effectively suppress the temperature rise of the belt holder 27.

To secure the gap S between the first shield 31 and the second shield 32, it is preferable that the first shield 31 and the second shield 32 include a plate material as thin as possible. For example, a thickness of the second shield 32 is preferably 0.15 mm or more and 0.6 mm. In the present embodiment, the first shield 31 includes a stainless plate having a thickness of 0.3 mm and the second shield 32 includes a copper plate having a thickness of 0.15 mm.

Examples of a material of the second shield 32 includes, but are not limited to, copper, steel such as stainless steel (SUS), and aluminum. To effectively release the heat, the second shield 32 preferably includes a material having a thermal conductivity of 10 W/m·k or more.

In the present embodiment, as illustrated in FIG. 5, when the second shield 32 is attached by being sandwiched between the fixed portion 27*c* of the belt holder 27 and the side plate 33, the second shield 32 is held in non-contact manner relative to the insertion portion 27*a* of the belt holder 27. Thus, the second shield 32 is held in a non-contact manner relative to the insertion portion 27*a* of the belt holder 27, the heat of the second shield 32 is less likely to be transmitted to the insertion portion 27*a*, and thus, it is also possible to effectively suppress the temperature rise of the lubricant adhering to the outer peripheral surface of the insertion portion 27*a*.

In the description of the present embodiment above, examples of the material that generates FPs/UFPs include, but are not limited to, fluorine grease, fluorine oil, silicone oil, and silicone grease, but the present disclosure is also applicable when a liquid or semi-solid lubricating substance (substance having a lubricating property) other than such examples is employed. In the present disclosure, the lubricating substance (substance having lubricity) refers to a substance interposed between components to reduce the frictional resistance between such components. Even when the liquid or semi-solid lubricating substance other than fluorine grease, fluorine oil, silicone oil, and silicone grease are accommodated in the fixing device, according to the present disclosure, it is possible to suppress the temperature rise of the belt holder and also possible to suppress the temperature rise of the lubricating substance adhering to the belt holder, and thus, it is possible to effectively suppress the generation of FPs/UFPs. If two or more types of lubricants adhere to the belt holder, it is preferable to control the temperature of the belt holder during continuous printing for 10 minutes to be lower than any of lower one of FPs/UFPs generation temperatures of such lubricants.

Figure 10:
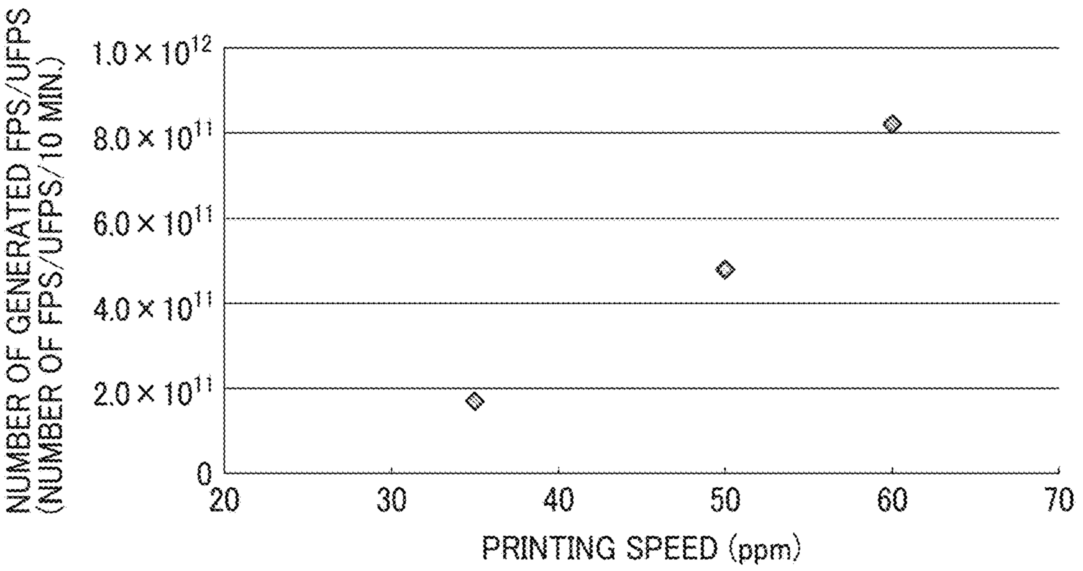
FIG. 10 is a graph illustrating a relationship between printing speed and the number of fine particles to be generated.

The temperature rise of the belt holder, which causes the generation of FPs/UFPs, is more pronounced in an image forming apparatus allowing a larger number of sheets to pass per unit time, and thus, the present disclosure may be expected to have a great effect especially when applied to an image forming apparatus allowing a large number of sheets to pass. According to FIG. 10 illustrating the relationship between the printing speed and the number of FPs/UFPs generated, the number of FPs/UFPs generated from the fixing device during continuous printing for 10 minutes particularly increases around when the printing speed exceeds 50 ppm (Page Per Minutes). Therefore, the present disclosure is expected to have a greater effect when applied to a fixing device or an image forming apparatus having a printing speed of 50 ppm or higher. As illustrated in FIG. 5, if the heater 23 is arranged inside the belt holder 27, the temperature of the belt holder 27 is also likely to rise, and thus, also in the fixing device having such a configuration, it is possible to expect a great effect by applying the present disclosure.

Next, an embodiment of the present disclosure different from the above-described embodiment (first embodiment) will be described. In the following description, differences from the above embodiment will be mainly described, and the rest of the description is basically the same, so such a part will not be described where appropriate.

Figure 11:
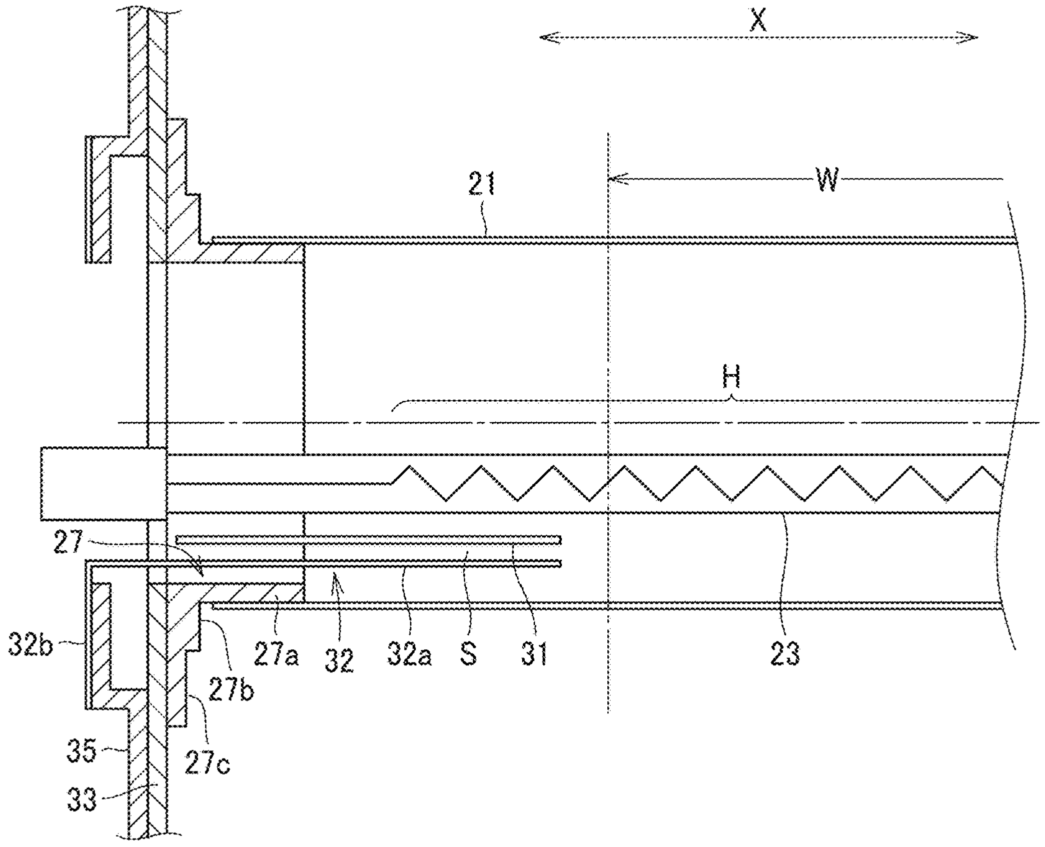
FIG. 11 is a cross-sectional view of an end of a fixing device according to a second embodiment of the present disclosure, cut along a longitudinal direction of a fixing belt.

FIG. 11 is a diagram illustrating a configuration of an end of a fixing device according to a second embodiment of the present disclosure.

In the second embodiment illustrated in FIG. 11, the second shield 32 is attached to the side plate 33 via a bracket 35 as an attachment member. More specifically, the bracket 35 is fixed to a surface opposite to a surface of the belt holder 27 of the side plate 33, and the attachment portion 32*b* of the second shield 32 is attached to a surface opposite to a surface fixed to the side plate 33 of such a bracket 35.

In such a case, the second shield 32 is not attached to be sandwiched between the side plate 33 and the belt holder 27 unlike in the first embodiment, and thus, it is possible to suppress the transfer of the heat from the second shield 32 to the belt holder 27. That is, the second shield 32 is arranged in a non-contact manner (not in direct contact with) in the belt holder 27, and thus, it is possible to suppress the heat of the second shield 32 from being transferred to the belt holder 27. Therefore, according to the configuration of the second embodiment, the temperature rise of the belt holder 27 is successfully suppressed more effectively.

Figure 12:
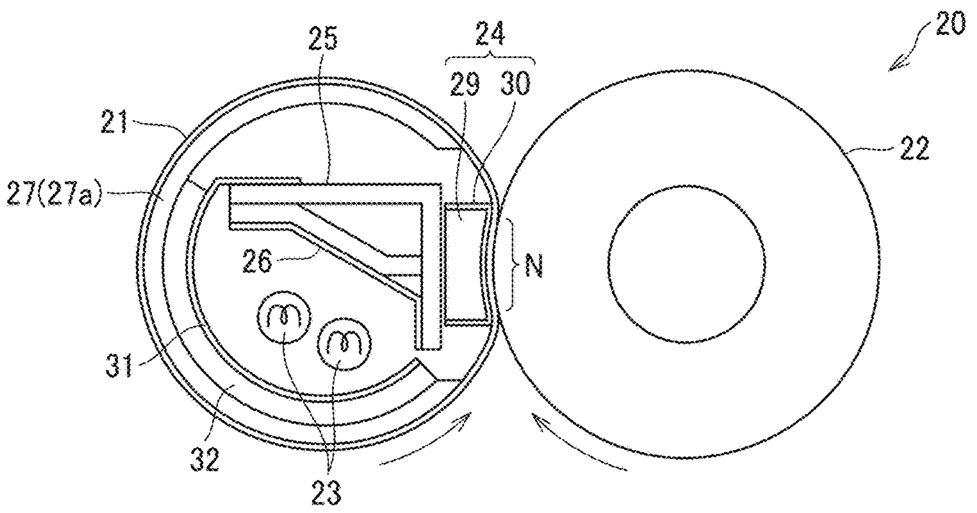
FIG. 12 is a cross-sectional view of an end of a fixing device according to a third embodiment of the present disclosure.
Figure 13:
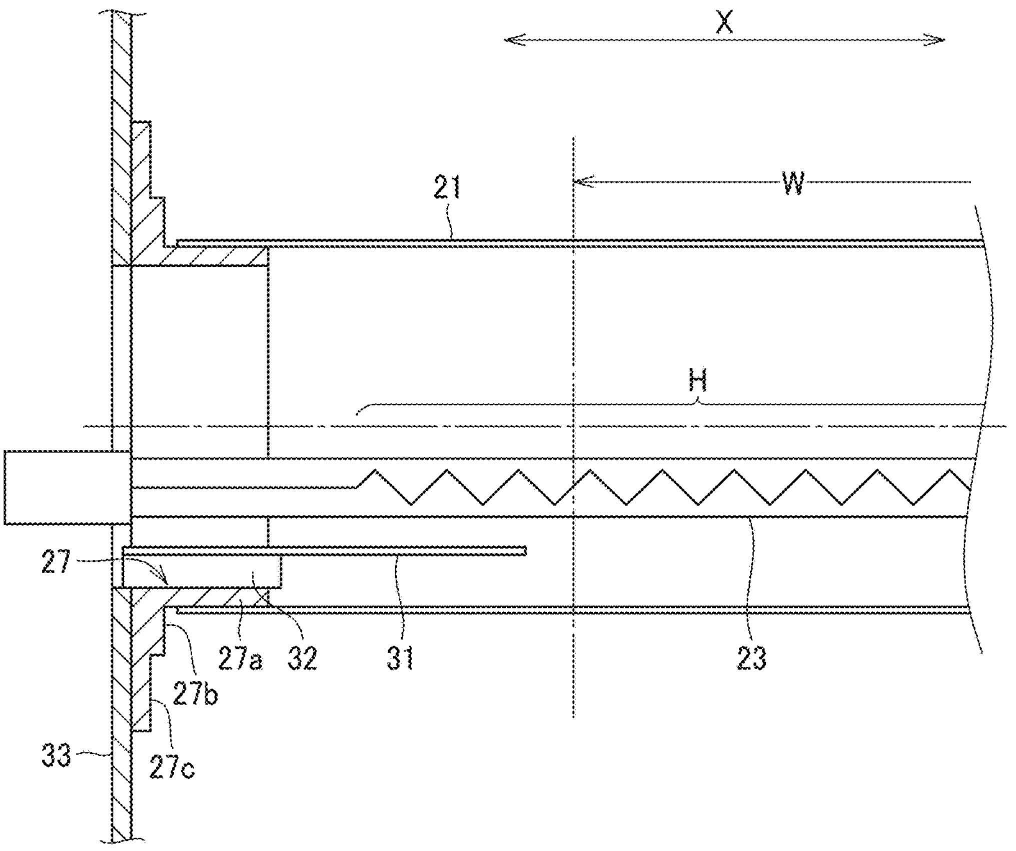
FIG. 13 is a cross-sectional view of an end of the fixing device according to the third embodiment of the present disclosure, cut along a longitudinal direction of a fixing belt.

FIG. 12 and FIG. 13 are diagrams illustrating a configuration of a fixing device according to a third embodiment of the present disclosure.

In the third embodiment illustrated in FIG. 12 and FIG. 13, the second shield 32 does not include a member having a high thermal conductivity as in the first embodiment, but on the contrary, includes a member having a low thermal conductivity. In such a case, the second shield 32 including a member having a low thermal conductivity is interposed between the first shield 31 and the belt holder 27, and as a result, the heat from the first shield 31 is less likely to be transmitted to the belt holder 27. As a result, it is possible to effectively suppress the temperature rise of the belt holder 27. That is, due to a heat insulating effect, the second shield 32 in the third embodiment functions as a heat transfer suppression member (second heat transfer suppression member) that suppresses the heat transfer to the belt holder 27.

In the present embodiment, the second shield 32 is held to be sandwiched between the first shield 31 and the belt holder 27, but the second shield 32 may be held by being integrally attached to the first shield 31. As illustrated in FIG. 13, the second shield 32 may be arranged in a contact manner relative to the first shield 31 and the belt holder 27, and arranged in a non-contact manner relative to the first shield 31 and the belt holder 27. The thermal conductivity of the second shield 32 is preferably 0.05 W/m·k or less to effectively suppress the heat transfer to the belt holder 27. For example, the second shield 32 preferably includes a member having low thermal conductivity and heat resistance such as glass wool.

Figure 14:
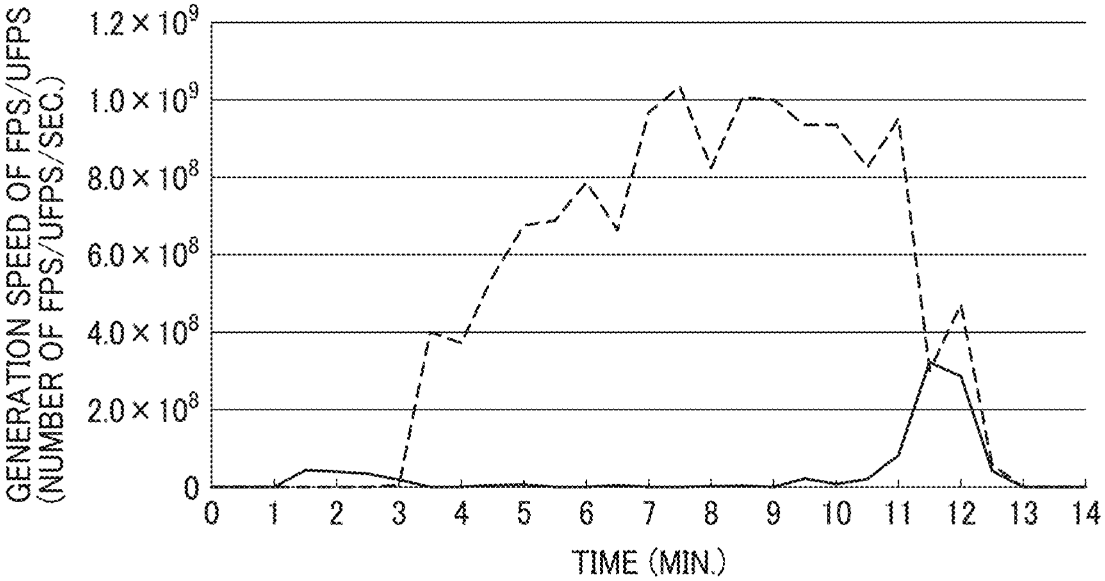
FIG. 14 is a graph illustrating a comparison of a generation speed of fine particles between the third embodiment and a comparative example.
Figure 15:
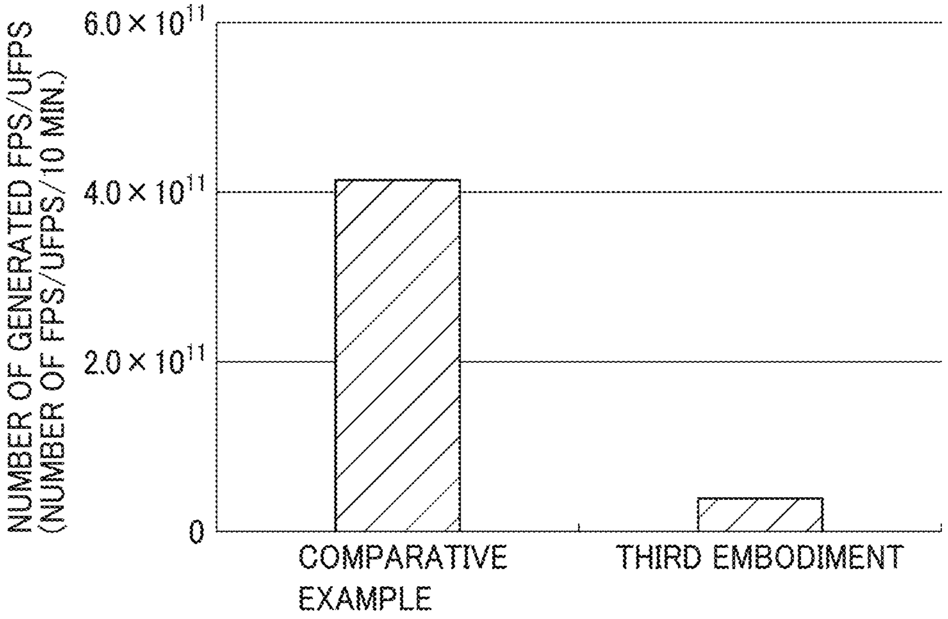
FIG. 15 is a graph illustrating a comparison of the number of fine particles to be generated between the third embodiment and a comparative example.

FIG. 14 and FIG. 15 illustrate the generation speed and the number of FPs/UFPs generated (cumulative number) during 10 minutes of the continuous sheet feeding when a fixing device according to the third embodiment is used. In such a case also, the test condition is the same as the test condition for the fixing device of the comparative example.

In FIG. 14 and FIG. 15, a solid line indicates a result of the third embodiment, and a dashed line indicates a result of the comparative example.

As illustrated in FIG. 14 and FIG. 15, also in the third embodiment, the number of FPs/UFPs generated was successfully reduced significantly as compared to the comparative example. Therefore, even in the configuration using the second shield 32 having a heat insulating function as in the third embodiment, it is possible to obtain the same effect as in each of the above embodiments.

As a method of suppressing the temperature rise of the belt holder, a configuration and a method described below are also effective.

Figure 16:
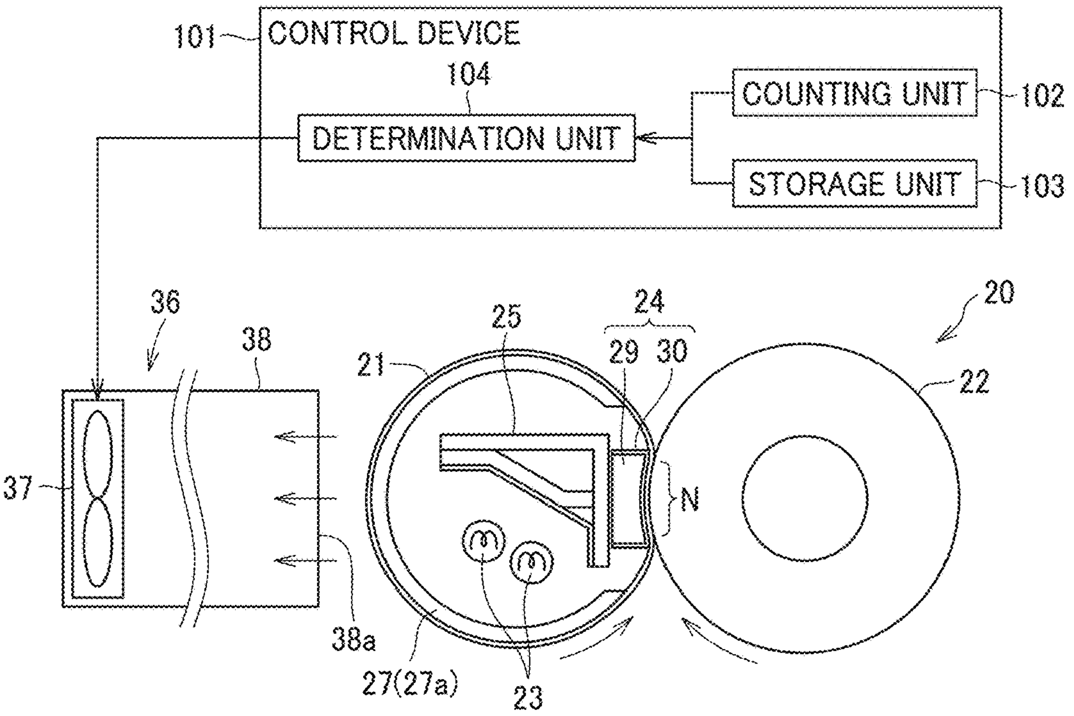
FIG. 16 is a diagram illustrating the configuration of a fixing device according to a fourth embodiment of the present disclosure.

In a fourth embodiment of the present disclosure illustrated in FIG. 16, a cooling device 36 that cools the belt holder 27 is provided. The cooling device 36 includes a suction fan 37 as an airflow generation member and a duct 38. An intake port 38*a* of the duct 38 is arranged to face both longitudinal ends of the fixing belt 21 where the belt holder 27 is arranged.

As illustrated in FIG. 16, in the present embodiment, there is provided a control device 101 serving as control circuitry including a counting unit 102 that counts the number of continuous prints, a storage unit 103 that stores a predetermined number of continuous prints as a criterion for determining whether to operate the cooling device 36, and a determination unit 104 that determines whether to operate the cooling device 36, based on information obtained from the counting unit 102 and the storage unit 103. The number of continuous prints stored in the storage unit 103 is set to a value smaller than a continuous prints obtained by previously specifying the continuous prints allowing for possible generation of FPs/UFPs from the lubricant on the belt holder 27, based on the correlation between the number of continuous prints obtained by an experiment and the like and the temperature of the belt holder 27, or the correlation between the number of continuous prints and the temperature of the lubricant on the belt holder 27. For example, if silicone oil is used as the lubricant, the number of continuous prints at which the temperature of the belt holder 27 reaches 210° C. where FPs/UFPs derived from silicone oil may generate is specified, and the number of prints smaller than the number of such specified continuous prints is set as a predetermined number of continuous prints serving as a determination criterion.

In the fourth embodiment configured as described above, when the number of continuous prints is counted by the counting unit 102 and the counted number of continuous prints reaches a predetermined number of continuous prints stored in the storage unit 103, the cooling device 36 operates according to an instruction from the determination unit 104.

As a result, the suction fan 37 starts rotating, and the air (hot air) near the belt holder 27 is suctioned through the duct 38. Further, as a result, an air current is generated around the belt holder 27, and therefore, the belt holder 27 is air-cooled and the temperature rise of the belt holder 27 is suppressed.

The airflow generation member that generates the airflow around the belt holder 27 may be a blower fan that blows air toward the fixing device 20 (belt holder 27) in addition to the suction fan 37 as described above.

As described above, in the fourth embodiment, when the counted number of continuous prints reaches a predetermined number of continuous prints, the cooling device 36 operates, and thus, before the number of continuous prints reaches the number of continuous prints allowing for possible generation of FPs/UFPs from the lubricant on the belt holder 27, the temperature of the belt holder 27 is successfully lowered. Here, the above-mentioned "when the counted number of continuous prints reaches a predetermined number of continuous prints" means not only a moment when the counted number of continuous prints reaches a predetermined number of continuous prints, but also a timing when the counted number of continuous prints exceeds a predetermined number of continuous prints and does not exceed the number of continuous prints allowing for possible generation of FPs/UFPs from the lubricant on the belt holder 27. Therefore, in the present embodiment, before FPs/UFPs are generated from the lubricant on the belt holder 27, the temperature of the belt holder 27 is successfully lowered and the generation of FPs/UFPs is successfully avoided in advance.

Figure 17:
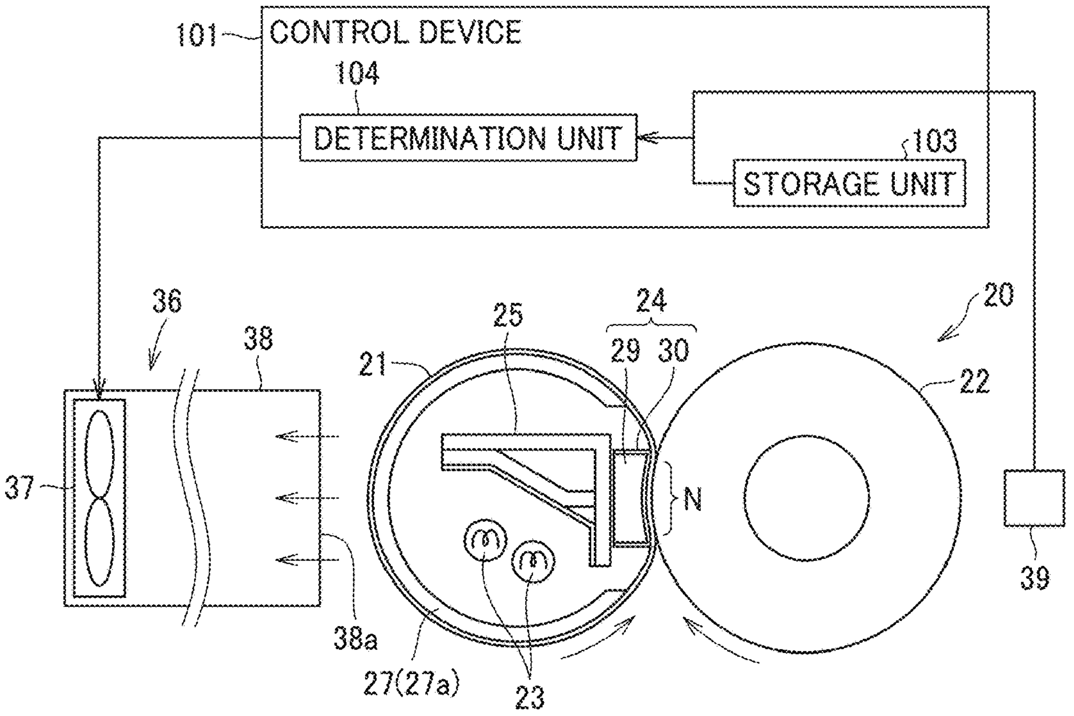
FIG. 17 is a diagram illustrating the configuration of a fixing device according to a fifth embodiment of the present disclosure.

As in a fifth embodiment of the present disclosure illustrated in FIG. 17, by using information for determining an operation timing of the cooling device 36, a detection temperature of a temperature sensor 39 may be used. In such a case, the temperature sensor 39, which is a temperature detection member, is arranged to face both longitudinal ends of the pressure roller 22, and a surface temperature of both longitudinal ends of the pressure roller 22 is detected. The storage unit 103 stores a temperature of the heating roller at which FPs/UFPs are not generated from the lubricant on the belt holder 27. That is, the temperature of the pressure roller 22 stored in the storage unit 103 specifies, based on the correlation between the temperature of the pressure roller 22 and the temperature of the belt holder 27, or the correlation between the temperature of the pressure roller 22 and the temperature of the lubricant on the belt holder 27, the temperature of the pressure roller 22 allowing for possible generation of FPs/UFPs from the lubricant on the belt holder 27, and such a temperature is set to a temperature having a value lower than the specified temperature of the pressure roller 22. It is noted that instead of the temperature of the pressure roller 22, the detection temperature of the temperature sensor 28 (see FIG. 2) that detects the temperature of the fixing belt 21 may be used.

In the present embodiment, when the detection temperature of the temperature sensor 39 rises and reaches a predetermined temperature stored in the storage unit 103, the cooling device 36 operates according to an instruction from the determination unit 104. As a result, as in the above embodiments, the belt holder 27 is air-cooled and the temperature rise of the belt holder 27 is successfully suppressed. Also in the present embodiment, the cooling device 36 may include a suction fan, or may include a blower fan.

Further, in the present embodiment, when the detection temperature reaches a predetermined temperature, the cooling device 36 operates, and thus, before the temperature of the pressure roller 22 reaches the temperature of the pressure roller 22 allowing for possible generation of FPs/UFPs from the lubricant on the belt holder 27, the temperature of the belt holder 27 is successfully lowered. Here, the above-mentioned "when the detection temperature reaches a predetermined temperature" means not only a moment when the detection temperature reaches a predetermined temperature, but also a timing when the detection temperature exceeds a predetermined temperature and does not exceed the temperature of the pressure roller 22 allowing for possible generation of FPs/UFPs from the lubricant on the belt holder 27. As a result, also in the present embodiment, the generation of FPs/UFPs is successfully avoided in advance.

In each embodiment illustrated in FIG. 16 and FIG. 17, the cooling device 36 is used to lower the temperature of the belt holder 27, but instead of the method using the cooling device 36, a method of reducing a printing speed (the number of prints per unit time) may be adopted.

Figure 18:
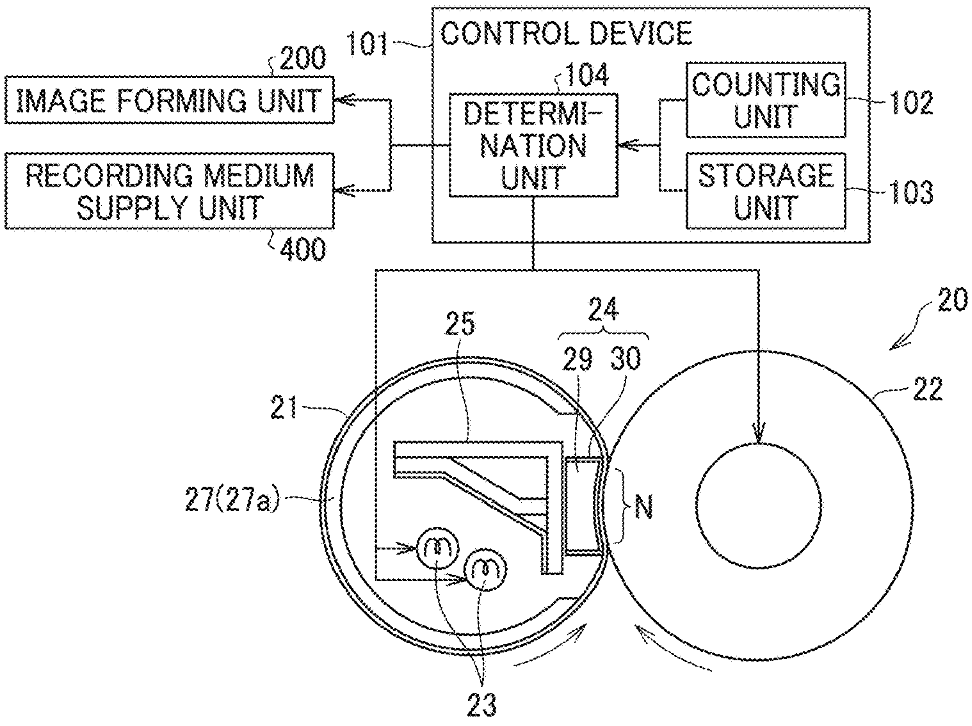
FIG. 18 is a diagram illustrating the configuration of a fixing device according to a sixth embodiment of the present disclosure.

A sixth embodiment of the present disclosure, illustrated in FIG. 18, is an embodiment using a method of reducing the printing speed. In such a case, the control device 101 includes not only the counting unit 102 that counts the number of continuous printing pages, but also the storage unit 103 that stores a previously set predetermined number of continuous prints, and the determination unit 104 that determines whether to reduce the printing speed, based on information obtained from the counting unit 102 and the storage unit 103. The number of continuous prints stored in the storage unit 103 is the same as in the above embodiments, and is set to a value smaller than the number of continuous prints assumed to generate FPs/UFPs from the lubricant on the belt holder 27.

In the present embodiment, when the counted number of continuous prints reaches the number of continuous prints stored in the storage unit 103, the printing speed is reduced according to an instruction from the determination unit 104. That is, not only an image formation operation in the image forming unit 200 and a sheet feeding operation in the recording medium supply unit 400, but also a conveyance speed of a sheet conveyance device is controlled. Along with this, a rotational drive of the pressure roller 22 and an amount of heat generated by the heater 23 are also controlled.

Thus, when the printing speed is reduced, the number of sheets to pass through the fixing device 20 per unit time is reduced, and thus, the heat generation amount of the heater 23 is successfully reduced. As a result, it is possible to suppress the temperature rise of the belt holder 27. In the present embodiment, before FPs/UFPs are generated from the lubricant, the printing speed is successfully reduced, and thus, as in the above embodiments, it is possible to prevent the generation of FPs/UFPs in advance.

Figure 19:
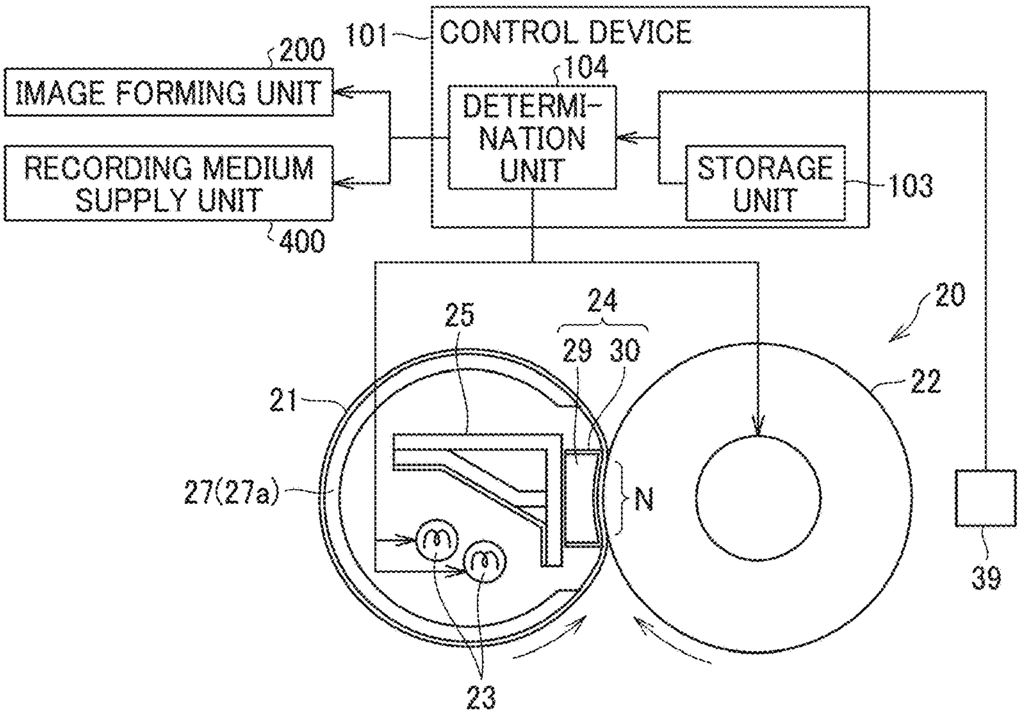
FIG. 19 is a diagram illustrating the configuration of a fixing device according to a seventh embodiment of the present disclosure.

As in a seventh embodiment of the present disclosure illustrated in FIG. 19, based on the temperature of the pressure roller 22 detected by the temperature sensor 39, whether to reduce the printing speed may be determined. In the storage unit 103 in the present embodiment, as in the above-described embodiments, a temperature set to a value smaller than the temperature of the pressure roller 22 assumed to generate FPs/UFPs from the lubricant on the belt holder 27 is stored. In such a case, when the detection temperature of the temperature sensor 39 rises to reach a predetermined temperature stored in the storage unit 103, the number of prints is reduced. As a result, the temperature of the belt holder 27 is successfully reduced before the generation of FPs/UFPs, and thus, the generation of FPs/UFPs is successfully avoided in advance. It is noted that also in the present embodiment, instead of the temperature of the pressure roller 22, the detection temperature of the temperature sensor 28 that detects the temperature of the fixing belt 21 may be used.

Thus, although each embodiment of the present disclosure has been described above, the present disclosure is not limited to the configurations of the embodiments, and can be modified as appropriate without departing from the scope of the present disclosure. In the above embodiments, as the heat transfer suppression member that suppresses the transfer of the radiant heat from the heater 23 to the belt holder 27, the first shield 31 and the second shield 32 are provided, but as long as it is possible to suppress the temperature of the belt holder 27 to 210° C. or less during continuous printing for 10 minutes, the first shield 31 may be omitted.

The present disclosure is not limited to the fixing device having the above configuration, and can be applied to a fixing device having various configurations. Some configurations of a fixing device according to other embodiments of the present disclosure are exemplified below.

Figure 20:
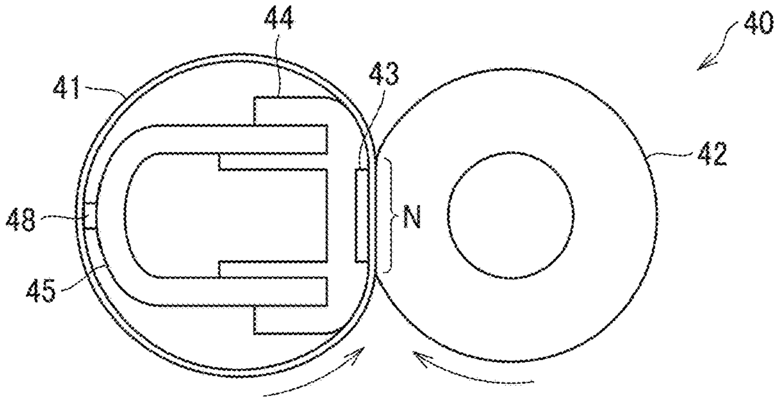
FIG. 20 is a cross-sectional view of the configuration of a fixing device according to another embodiment of the present disclosure.
Figure 21:
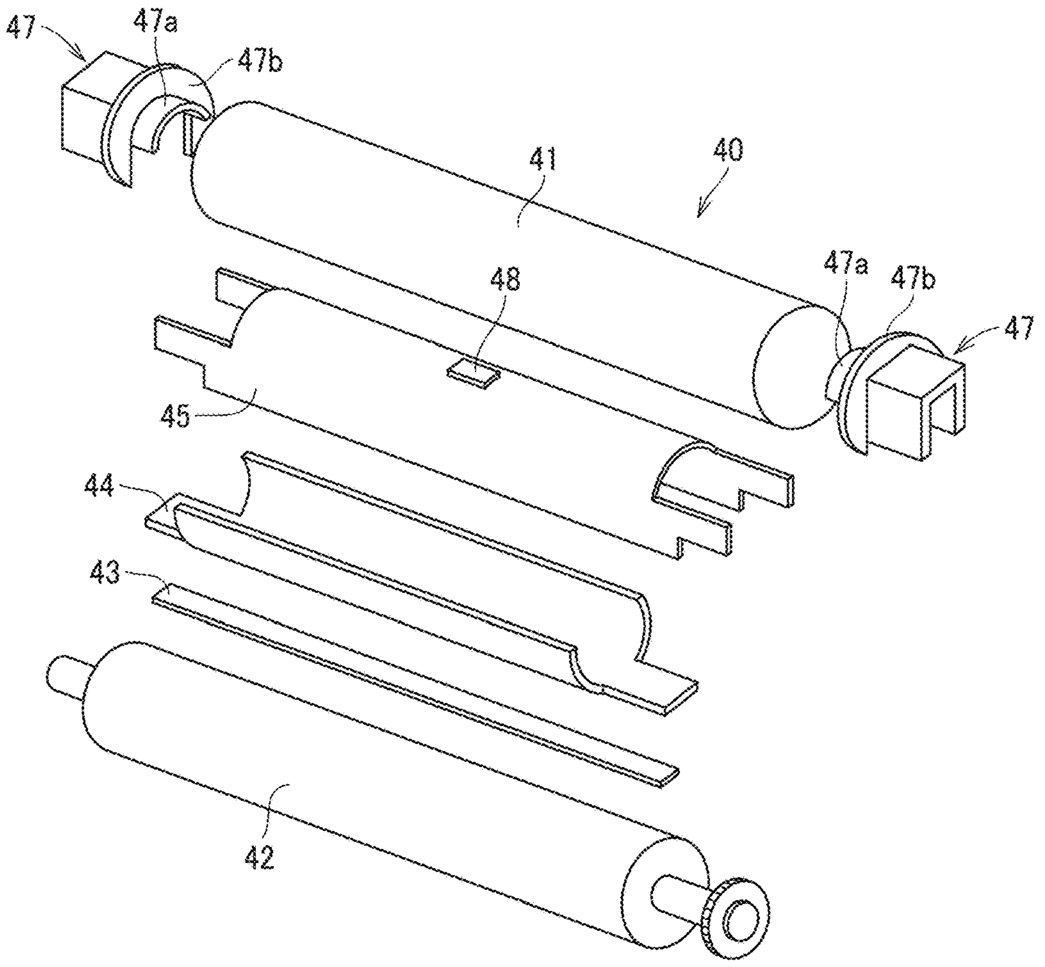
FIG. 21 is an exploded perspective view of the fixing device illustrated in FIG. 20.

A fixing device 40 illustrated in FIG. 20 and FIG. 21 includes a fixing belt 41 serving as the first rotating body, a pressure roller 42 serving as the second rotating body, a heater 43 serving as the heating source, a heater holder 44 serving as a heating source holder, a pressure stay 45 serving as the supporting member, a thermistor 48 serving as the temperature detection member, and a flange 47 serving as the rotating body holder (see FIG. 21).

Function and configurations of the fixing belt 41 and the pressure roller 42 illustrated in FIG. 20 are basically the same as those of the fixing belt 21 and the pressure roller 22 illustrated in FIG. 2.

The heater 43 is a ceramic heater having a plate-shaped substrate and a resistance heating element provided on such a substrate, and generates heat by energization to the resistance heating element. The heater 43 is arranged to contact the inner peripheral surface of the fixing belt 41, and when the heater 43 generates heat, the fixing belt 41 is heated from the inside. The heater 43 also functions as a nip forming member that forms the nip portion N with the fixing belt 41 sandwiched between the heater 43 and the pressure roller 42.

The heater holder 44 is a heating source holder that holds the heater 43. The heater holder 44 includes a heat-resistant resin, for example. In such a case, when the heater holder 44 is formed along the inner peripheral surface of the fixing belt 41 to have a semi-arc cross section, a rotational trajectory of the fixing belt 41 is regulated by the heater holder 44.

The pressure stay 45 is a supporting member that supports the heater holder 44. When the pressure stay 45 is supported by the heater holder 44, bending of the heater holder 44 and the heater 43 due to the pressure applied by the pressure roller 42 is suppressed, and as a result, the nip portion N having a uniform width is formed between the pressure roller 42 and the fixing belt 41. To ensure rigidity, the pressure stay 45 preferably includes a metal material such as stainless steel (SUS).

The pressure stay 45 includes a thermistor 48 as the temperature detection member. The thermistor 48 detects the temperature of the fixing belt 41 by facing the inner peripheral surface of the fixing belt 41 in a contact or non-contact manner.

The flange 47 includes a pair of flanges 47 functioning as a pair of holders that hold both longitudinal ends of the fixing belt 41 as in the belt holder 27. Each flange 47 also includes a backup portion 47*a* serving as an insertion portion inserted into the fixing belt 41, and a flange portion 47*b* serving as a restricting portion that restricts movement of the fixing belt 41 in the longitudinal direction. In such a case, when each flange 47 is biased toward each end of the fixing belt 41 by a biasing member such as a spring, each flange 47 is held while being inserted into the fixing belt 41.

Also in the fixing device 40 having such a configuration, when the heater 43 generates heat, the temperature of the flange 47 rises, and the temperature of the lubricant adhering to the flange 47 rises, which may cause generation of FPs/UFPs. Therefore, when the present disclosure is applied to the fixing device 40 illustrated in FIG. 20 and FIG. 21, it is possible to suppress the temperature rise of the flange 47 and suppress the generation of FPs/UFPs.

Figure 22:
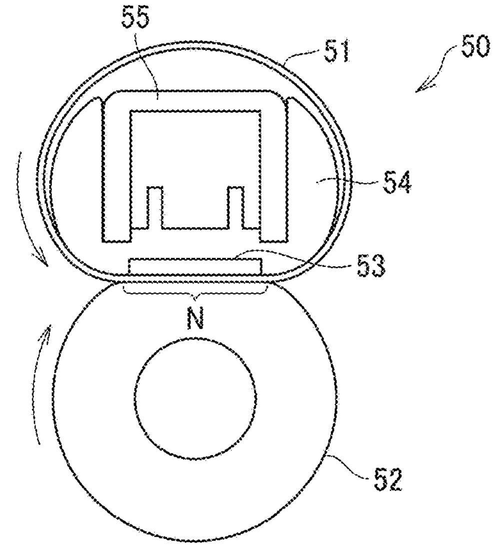
FIG. 22 is a cross-sectional view of the configuration of a fixing device according to another embodiment of the present disclosure.
Figure 23:
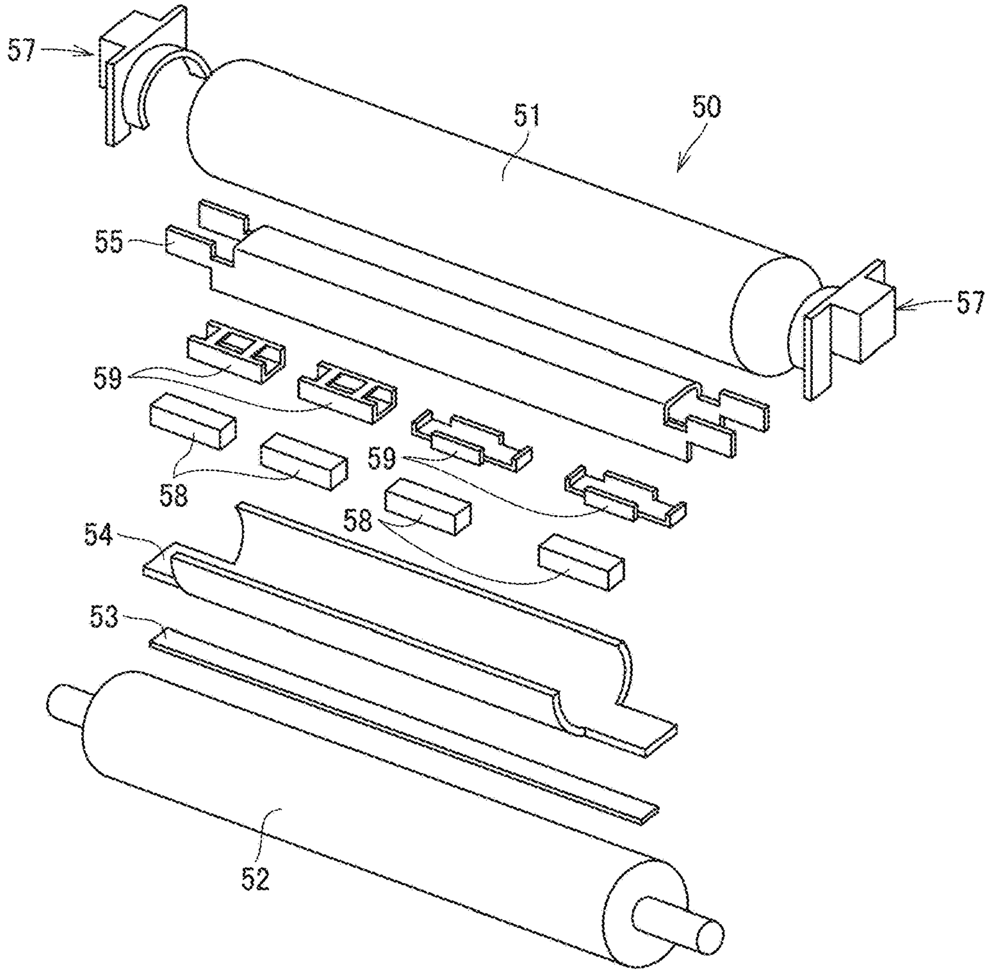
FIG. 23 is an exploded perspective view of the fixing device illustrated in FIG. 22.

Next, a fixing device 50 illustrated in FIG. 22 and FIG. 23 is a fixing device including a ceramic heater (heater 53) as in the fixing device 40 illustrated in FIG. 20 and FIG. 21 above. Specifically, the fixing device 50 illustrated in FIG. 22 and FIG. 23 includes a fixing belt 51 serving as the first rotating body, a pressure member 52 serving as the second rotating body, a heater 53 serving as the heating source, a heater holder 54 serving as the heating source holder, a reinforcement member 55 serving as the supporting member, a belt holding unit 57 (see FIG. 23) serving as the rotating body holder, a thermosensitive element 58 (see FIG. 23) serving as the temperature detection member, and a cover member 59 (see FIG. 23).

Functions and configurations of the fixing belt 51, the pressure member 52, the heater 53, the heater holder 54, the reinforcement member 55, and the belt holding unit 57 illustrated in FIG. 22 and FIG. 23 are basically the same as those of the fixing belt 41, the pressure roller 42, the heater 43, the heater holder 44, the pressure stay 45, and the flange 47 illustrated in FIG. 20 and FIG. 21.

The thermosensitive element 58 is arranged on the opposite side of the surface on which the heater 53 of the heater holder 54 is held, and detects a temperature of the heater 53 via the heater holder 54. When the heat generation of the heater 53 is controlled based on the detection temperature of the thermosensitive element 58, the fixing belt 51 is maintained at a predetermined fixing temperature.

The cover member 59 is a box-shaped member including a heat-resistant resin.

When being arranged to face the heater holder 54 via the thermosensitive element 58 inside the fixing belt 51, the corresponding thermosensitive element 58 is covered with the cover member 59.

Thus, the fixing device to which the present disclosure is applied may include the thermosensitive element 58 that detects the temperature of the heater 53 and the cover member 59 that covers the thermosensitive element 58.

Figure 24:
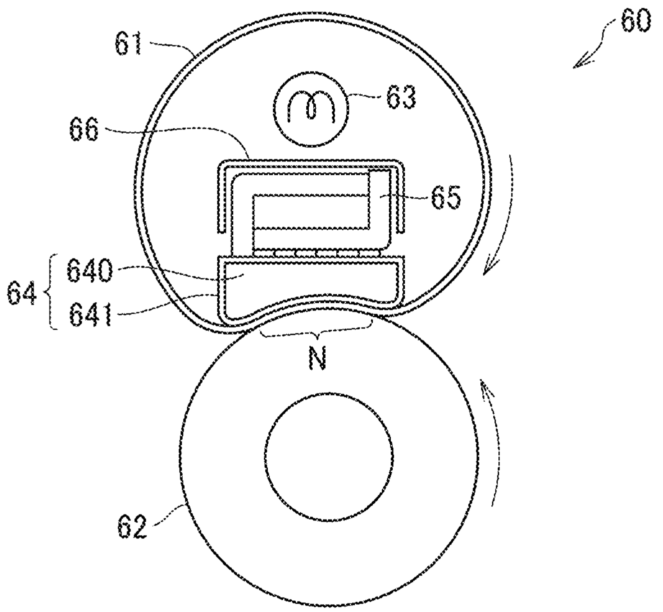
FIG. 24 is a cross-sectional view of the configuration of a fixing device according to another embodiment of the present disclosure.
Figure 25:
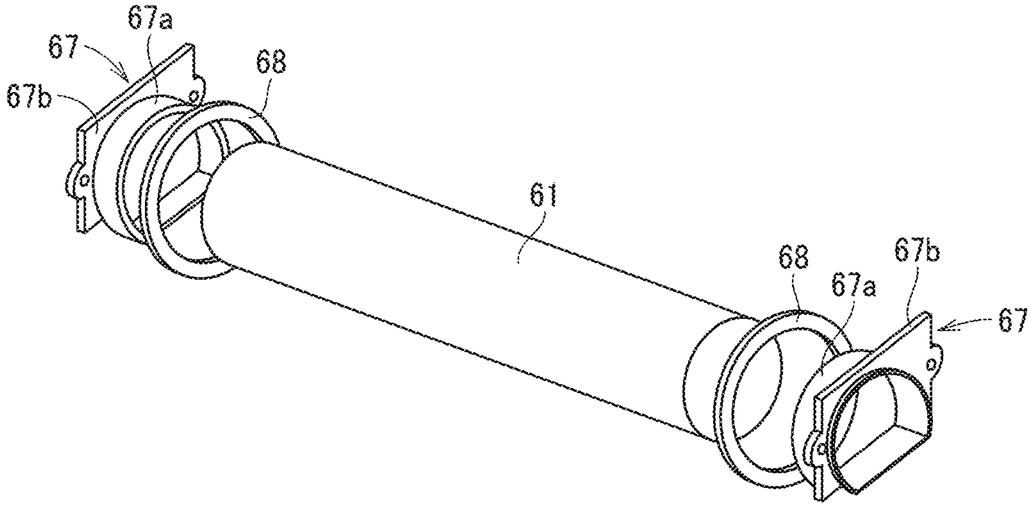
FIG. 25 is an exploded perspective view of the fixing device illustrated in FIG. 24.

Next, a fixing device 60 illustrated in FIGS. 24 and 25 is a fixing device including a halogen heater (heater 63) serving as a heating source, similarly to the fixing device 20 illustrated in FIGS. 2 and 3 above. Specifically, the fixing device 60 illustrated in FIG. 24 and FIG. 25 includes a fixing belt 61 serving as the first rotating body, a pressure roller 62 serving as the second rotating body, a heater 63 serving as the heating source, a nip forming member 64, a support unit 65 serving as the supporting member, a reflecting plate 66 serving as a reflecting member, a holding frame 67 (see FIG. 25) serving as the rotating body holder, and a ring 68 serving as a sliding member (see FIG. 25).

Functions and configurations of each of the fixing belt 61, the pressure roller 62, the heater 63, the nip forming member 64, the support unit 65, the reflecting plate 66, and the holding frame 67 illustrated in FIGS. 24 and 25 are basically the same as those of the fixing belt 21, the pressure roller 22, the heater 23, the nip forming member 24, the stay 25, the reflecting member 26, and the belt holder 27 illustrated in FIG. 2 and FIG. 3. It is noted that the nip forming member 64 includes a base pad 640 including metal, and a sliding sheet 641 including fluorine resin interposed between the base pad 640 and the inner peripheral surface of the fixing belt 61.

The ring 68 is attached to the outer peripheral surface of a cylindrical portion 67*a* serving as an insertion portion of the holding frame 67 inserted into the fixing belt 61, and is interposed between an edge of a longitudinal end of the fixing belt 61 and a fixing plate 67*b* serving as a regulating portion of the holding frame 67. When the fixing belt 61 rotates, the ring 68 rotates together with the fixing belt 61, or the fixing belt 61 slides against the low-friction ring 68, and as a result, the sliding resistance generated between the fixing belt 61 and the holding frame 67 is reduced.

Thus, the fixing device to which the present disclosure is applied may include the ring 68.

Figure 26:
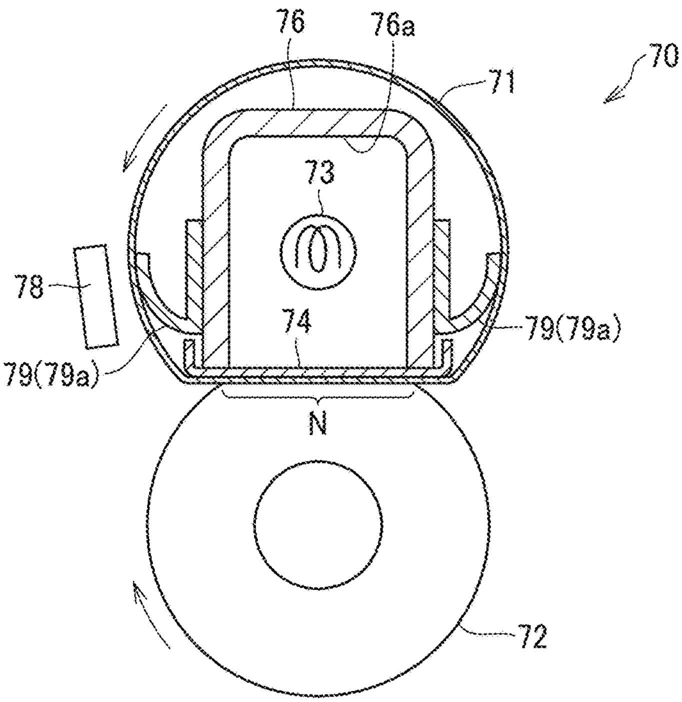
FIG. 26 is a cross-sectional view of the configuration of a fixing device according to another embodiment of the present disclosure.
Figure 27:
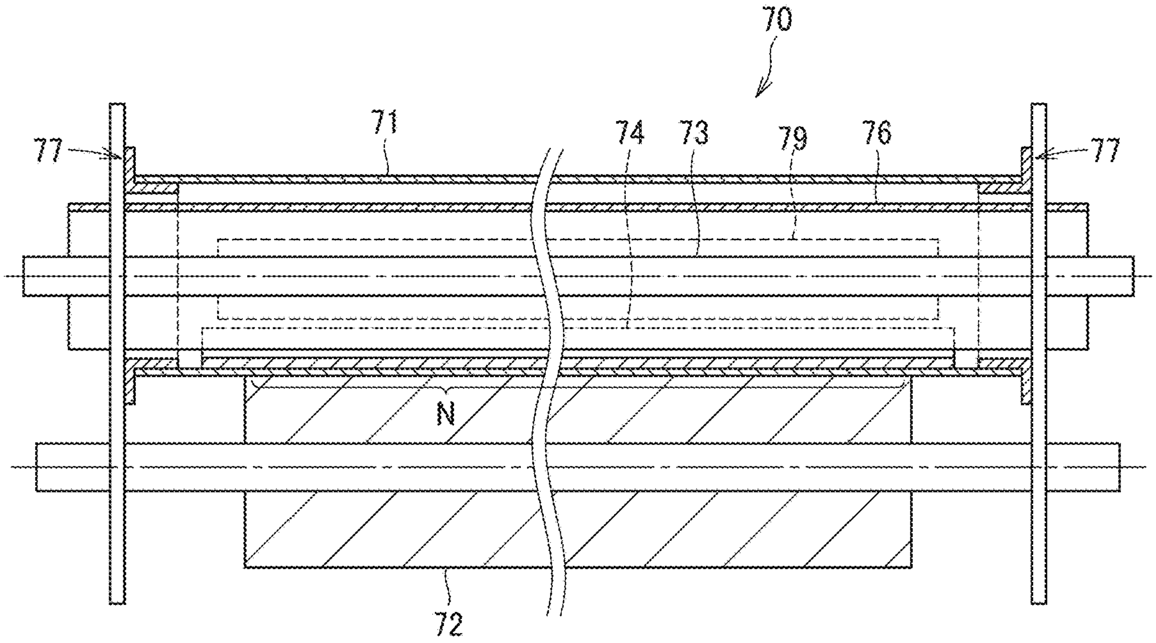
FIG. 27 is a cross-sectional view of the fixing device illustrated in FIG. 26, cut along a longitudinal direction of a fixing belt.

Next, a fixing device 70 illustrated in FIGS. 26 and 27 is a fixing device including a halogen heater 73 as a heating source, similarly to the fixing device 20 illustrated in FIGS. 2 and 3 above. Specifically, the fixing device 70 illustrated in FIGS. 26 and 27 includes a fixing belt 71 serving as the first rotating body, a pressure roller 72 serving as the second rotating body, the halogen heater 73 serving as the heating source, a nip forming member 74, a reflecting member 76, a belt supporting member 77 (see FIG. 27) serving as the rotating body holder, a temperature sensor 78 serving as the temperature detection member, and a guide member 79.

The fixing belt 71, the pressure roller 72, the halogen heater 73, the nip forming member 74, the reflecting member 76, the belt supporting member 77, and the temperature sensor 78 illustrated in FIGS. 26 and 27 basically include the same functions as the fixing belt 21, the pressure roller 22, the heater 23, the nip forming member 24, the reflecting member 26, the belt holder 27, and the temperature sensor 28 illustrated in FIG. 2 and FIG. 3.

It is noted that the reflecting member 76 illustrated in FIGS. 26 and 27 mainly reflects the radiant heat (infrared rays) emitted from the halogen heater 73 to the nip forming member 74 rather than to the fixing belt 71. The reflecting member 76 is formed to have a U-shaped cross section to cover the outside of the halogen heater 73, and has an inner surface 76*a* facing the halogen heater 73 of the reflecting member 76 as a reflecting surface having high reflectivity. Therefore, when the radiant heat is emitted from the halogen heater 73, the radiant heat is reflected to the nip forming member 74 by the reflecting surface 76*a* of the reflecting member 76.

As a result, the nip forming member 74 is heated by the radiant heat released from the halogen heater 73 toward the nip forming member 74 and the radiant heat reflected by the reflecting member 76 to the nip forming member 74. The heat of the nip forming member 74 is transferred to the fixing belt 21 at the nip portion N. That is, in such a case, the nip forming member 74 forms the nip portion N and also functions as a heat transfer member that transfers the heat to the fixing belt 71 at the nip portion N. Therefore, the nip forming member 74 includes a metal material such as copper or aluminum, which has good thermal conductivity.

The reflecting member 76 also functions as a supporting member (stay) that supports the nip forming member 74. When the reflecting member 76 supports the nip forming member 74 over the longitudinal direction of the fixing belt 71, bending of the nip forming member 74 is suppressed, and the nip portion N having a uniform width is formed between the fixing belt 71 and the pressure roller 72. To ensure the function as a supporting member, the reflecting member 76 preferably includes a highly rigid metal material such as SUS or SECC.

The guide member 79 is a member that is arranged inside the fixing belt 71 and that guides the rotating fixing belt 71 from the inside. The guide member 79 includes a guide surface 79*a* curving along the inner peripheral surface of the fixing belt 71, and when the fixing belt 71 is guided along the guide surface 79*a*, the fixing belt 71 rotates smoothly without being greatly deformed.

As described above, the fixing device to which the present disclosure is applied may have a configuration in which the heat of the halogen heater 73 is transferred through the nip forming member 74 having good thermal conductivity to heat the fixing belt 71.

Figure 28:
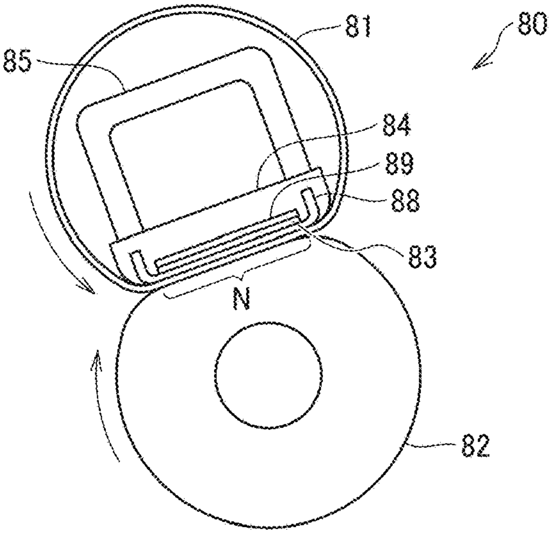
FIG. 28 is a cross-sectional view of the configuration of a fixing device according to another embodiment of the present disclosure.
Figure 29:
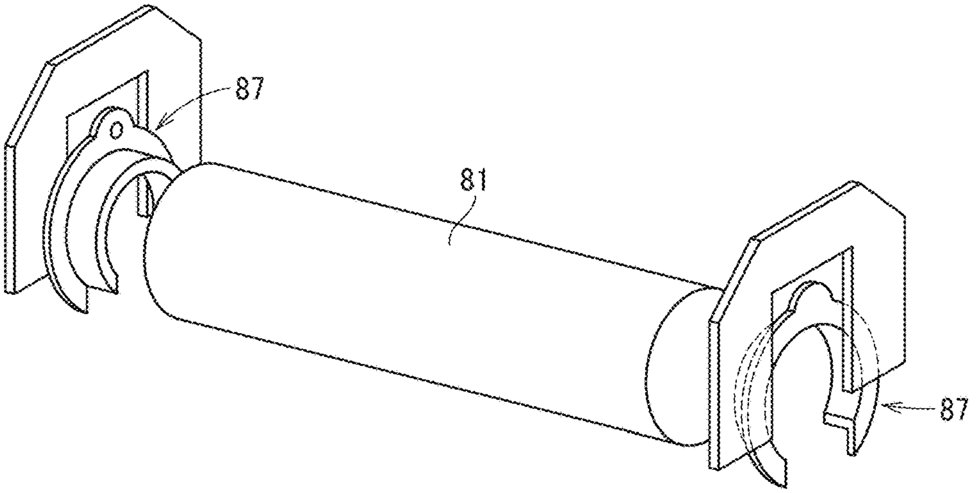
FIG. 29 is an exploded perspective view of the fixing device illustrated in FIG. 28.

Next, similarly to the fixing device 40 illustrated in FIG. 20 and FIG. 21 above, a fixing device 80 illustrated in FIG. 28 and FIG. 29 is a fixing device including a ceramic heater (heater 83) as a heating source. Specifically, the fixing device 80 illustrated in FIGS. 28 and 29 includes a fixing belt 81 serving as the first rotating body, a pressure roller 82 serving as the second rotating body, a heater 83 serving as the heating source, a heater holder 84 serving as the heating source holder, a stay 85 serving as the support member, an arc-shaped guide 87 (see FIG. 29) serving as the rotating body holder, a heat diffusion member 88 that is a heat transfer member, and a heat insulating plate 89 serving as a heat insulating member.

The fixing belt 81, the pressure roller 82, the heater 83, the holder 84, the stay 85, and the arc-shaped guide 87 illustrated in FIGS. 28 and 29 have basically the same function as the fixing belt 41, the pressure roller 42, the heater 43, the heater holder 44, the pressure stay 45, and the flange 47 illustrated in FIG. 20 and FIG. 21. It is noted that in addition to the heater 83, the holder 84 holds the heat diffusion member 88 and the heat insulating plate 89 in an overlapping state.

The heat diffusion member 88 includes a metal material such as stainless steel, aluminum alloy, and iron. The heat diffusion member 88 is arranged to contact the inner peripheral surface of the fixing belt 81, transfers the heat generated from the heater 83 to the fixing belt 81, and contacts the pressure roller 82 via the fixing belt 81 to from the nip portion N. Between the heater 83 and the heat diffusion member 88, heat conductive grease is applied to improve the efficiency of heat transfer from the heater 83 to the heat diffusion member 88. On the other hand, to suppress the heat of the heater 83 from being transmitted to the holder 84 and the stay 85, the heat insulating plate 89 is arranged on the side opposite to the surface of the heater 83 at the heat diffusion member 88 side.

When the fixing belt 81 rotates, the fixing belt 81 slides against the heat diffusion member 88, and thus, a lubricant is applied between the fixing belt 81 and the heat diffusion member 88 to improve slidability. A sliding surface of the heat diffusion member 88 contacting the fixing belt 81 is formed with a surface layer such as glass coating or hard chrome plating having low friction and wear resistance.

In such a fixing device also, when the temperature of the arc-shaped guide 87 rises due to the heat generated by the heater 83, the temperature of the lubricant adhering to the arc-shaped guide 87 rises, which may cause the generation of FPs/UFPs, and thus, when the present disclosure is applied, it is possible to suppress the generation of FPs/UFPs.

Figure 30:
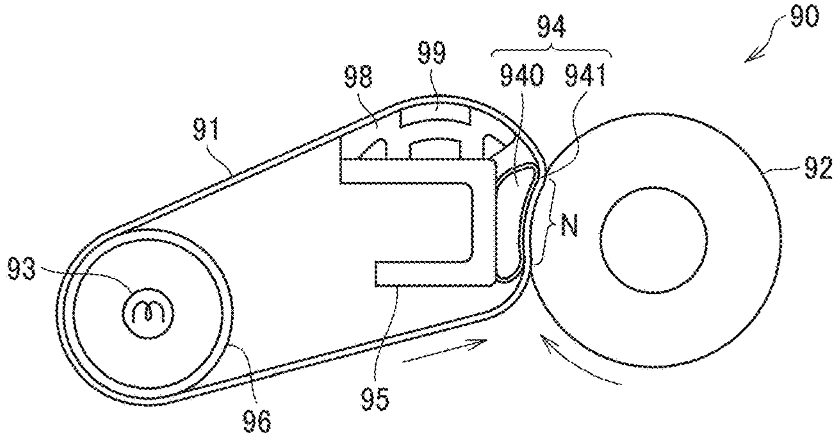
FIG. 30 is a cross-sectional view of the configuration of a fixing device according to another embodiment of the present disclosure.
Figure 31:
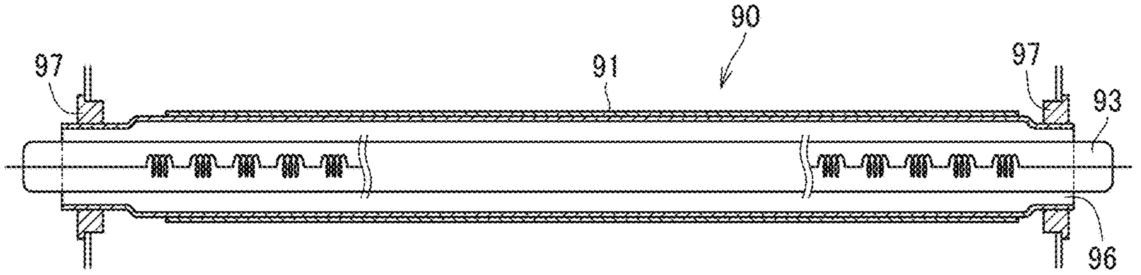
FIG. 31 is a cross-sectional view of a pressure roller illustrated in FIG. 30, illustrating a holding structure of the pressure roller.

Next, a fixing device 90 illustrated in FIGS. 30 and 31 is a fixing device including an endless belt 91 serving as the first rotating body, a heating roller 96 serving as the heating member, a heater 93 serving as the heating source, a pressing roller 92 serving as the second rotating body, a nip forming member 94, a supporting member 95, a guide member 98, a lubricant application member 99 as a lubricant supply member, and bearings 97 (see FIG. 31).

As illustrated in FIG. 30, the belt 91 is wound around the heating roller 96, the nip forming member 94, and the guide member 98. When the heating roller 96 is biased in a direction away from the nip forming member 94 by a spring or the like, a predetermined tension is applied to the belt 91. In such a state, the pressing roller 92 is rotationally driven to rotate and drive the belt 91.

The nip forming member 94 includes a pressing member 940, and a low-friction sliding sheet 941 interposed between the pressing member 940 and an inner peripheral surface of the belt 91. The pressing member 940 is supported by the supporting member 95, and as a result, the pressing member 940 receives a pressing force of the pressing roller 92 to form the nip portion N.

The heater 93 is a halogen heater or the like, and is arranged inside the heating roller 96. When the heater 93 generates heat, the heating roller 96 is heated and the heat of the heating roller 96 is transferred to the belt 91.

The lubricant application member 99 contacts the inner peripheral surface of the belt 91 and supplies a lubricant improving slidability of the inner peripheral surface of the belt 91. Along with rotation of the belt 91, the lubricant supplied to the inner peripheral surface of the belt 91 is interposed between the guide member 98 and the belt 91 and between the nip forming member 94 and the belt 91 to realize a smooth rotation of the belt 91.

Here, the heating roller 96 is held by the bearings 97 such as, generally, a plain bearing or a ball bearing so that the heating roller 96 is rotatable. The bearings 97 as such rotating body holders are attached to both axial ends (both longitudinal ends) of the heating roller 96, and each bearing 97 is applied with a lubricant for reducing the sliding resistance or the rotational torque when the heating roller 96 rotates.

Therefore, when the heating roller 96 is heated and the bearing 97 is affected by the heat, the temperature of the lubricant adhering to the bearing 97 rises, which may cause the generation of FPs/UFPs. Therefore, it is preferable to apply the present disclosure also to the fixing device illustrated in FIG. 30. For example, when the first shield 31 and the second shield 32 as heat transfer suppression member as described above are arranged inside the heating roller 96, the transfer of the heat from the heater 93 to the rotating body holder (bearing 97) that holds the heating roller 96 is successfully and effectively suppressed. As a result, it is possible to reduce the number of FPs/UFPs generated, as in the above embodiments.

Figure 32:
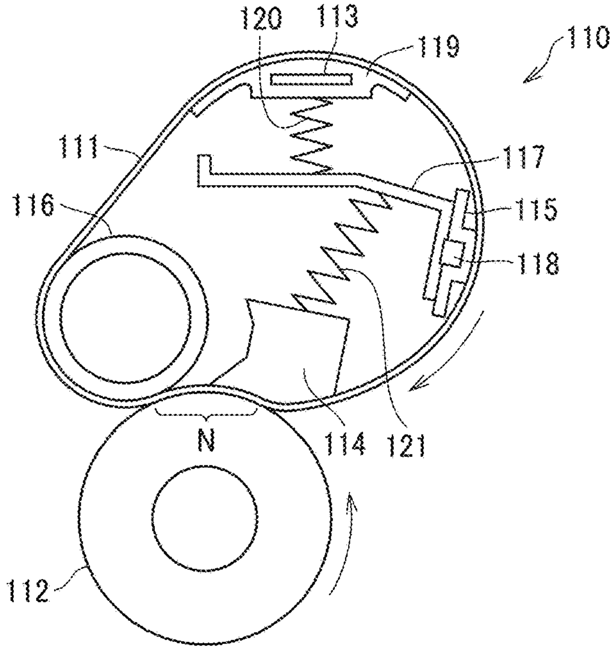
FIG. 32 is a cross-sectional view of a configuration of a fixing device according to another embodiment of the present disclosure.
Figure 33:
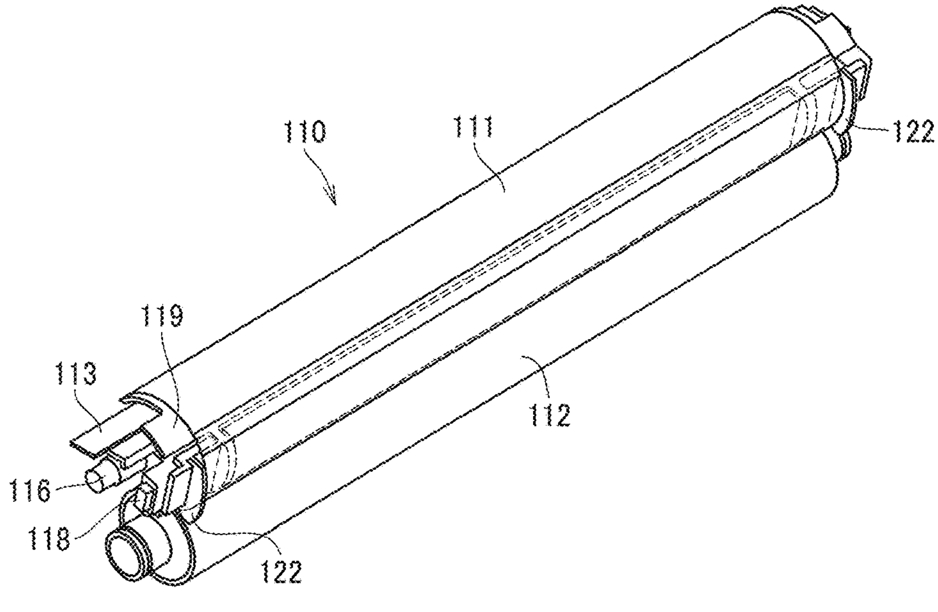
FIG. 33 is a perspective view of the fixing device illustrated in FIG. 32.

The present disclosure is also applicable to a fixing device 110 configured as illustrated in FIGS. 32 and 33.

The fixing device 110 illustrated in FIGS. 32 and 33 includes a fixing belt 111 serving as the first rotating body, a fixing roller 116, a pressure roller 112 serving as the second rotating body, a heater 113 serving as the heating source, a pressure pad 114 serving as the nip forming member, a guide member 115, a supporting member 117, a temperature sensor 118 serving as the temperature detection member, a heat transfer member 119, and belt holders 122 (see FIG. 33) serving as the rotating body holder.

The fixing belt 111 illustrated in FIG. 32 is wound around the fixing roller 116, the pressure pad 114, the guide member 115, and the heat transfer member 119. When the pressure roller 112 is rotated and driven, the fixing roller 116 rotates along therewith.

The heater 113 is a planar or plate-like heater such as a ceramic heater, and is provided on the heat transfer member 119. The heat transfer member 119 is interposed between the heater 113 and the fixing belt 111 and is a member that transfers heat from the heater 113 to the fixing belt 111. The heat transfer member 119 is biased by a spring 120 attached to the supporting member 117 to contact the inner peripheral surface of the fixing belt 111.

The pressure pad 114 is biased by another spring 121 attached to the supporting member 117 to contact the inner peripheral surface of the fixing belt 111. As a result, the pressure pad 114 is pressed against the pressure roller 112 via the fixing belt 111, and the nip portion N is formed between the fixing belt 111 and the pressure roller 112.

The guide member 115 is attached to and supported by the supporting member 117.

The temperature sensor 118 is attached to the guide member 115 and the temperature of the fixing belt 111 is detected by the temperature sensor 118.

Also in the fixing device 110 as illustrated in FIG. 32, the belt holders 122 are provided to hold both longitudinal ends of the fixing belt 111, and thus, when the fixing belt 111 is heated, the temperature of the lubricant adhering to the belt holder 122 rises, and as a result, FPs/UFPs may be generated. Therefore, also in such a fixing device 110, when the present disclosure is applied, as in the above embodiments, it is possible to effectively prevent the generation of FPs/UFPs.

The present disclosure is not limited to be applied to the fixing device mounted in the electrophotographic image forming apparatus as described above. For example, the present disclosure is applicable to a heating device other than the fixing device such as a drying device that is mounted in an inkjet image forming apparatus and is a device for drying a liquid such as ink applied onto sheet paper.

Figure 39:
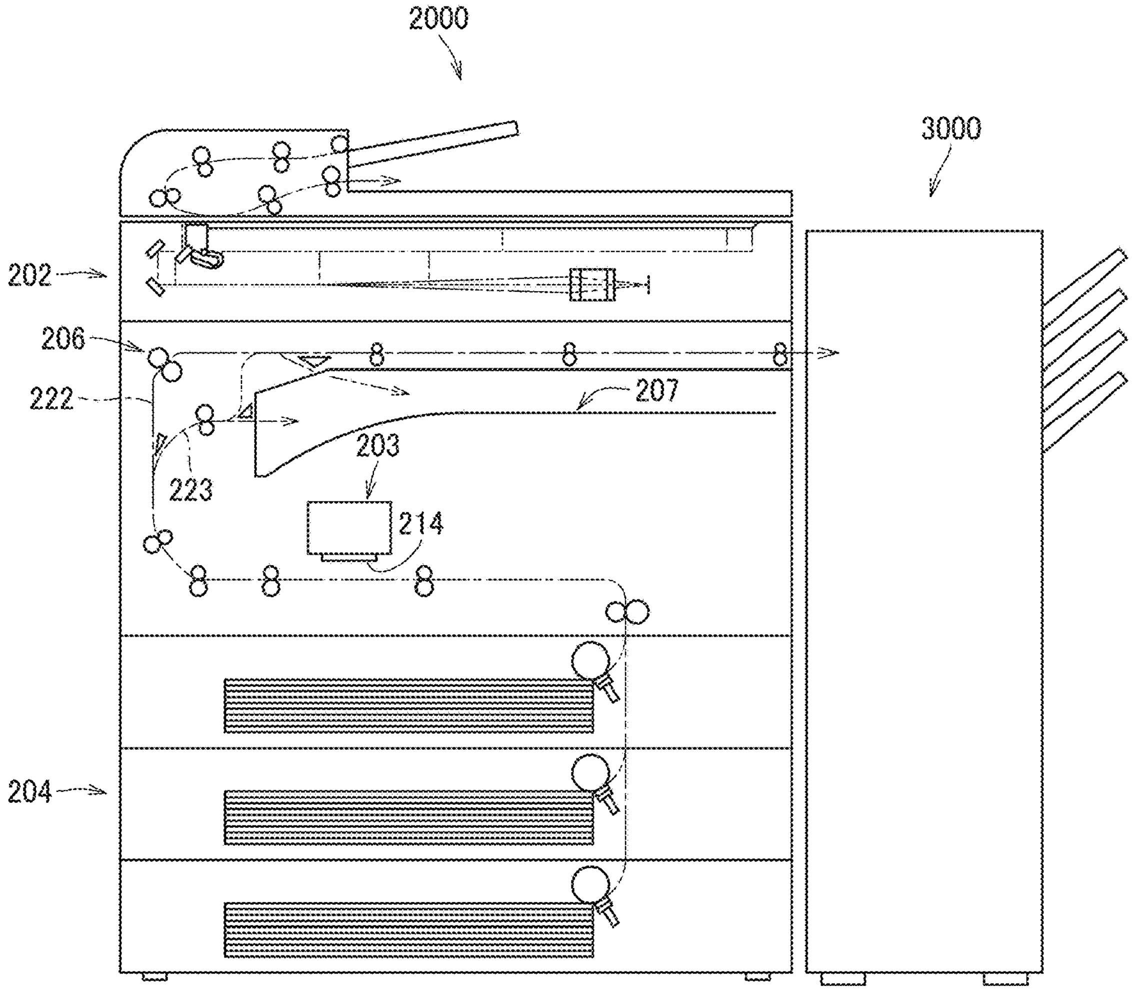
FIG. 39 is a diagram illustrating one form of an inkjet image forming apparatus including a drying device.

FIG. 39 illustrates one form of an inkjet image forming apparatus including a drying device.

An inkjet image forming apparatus 2000 illustrated in FIG. 39 includes an image reading device 202, an image forming unit 203, a sheet supply device 204, a drying device 206, and a sheet ejection unit 207. A sheet aligning device 3000 is arranged beside the inkjet image forming apparatus 2000.

In the inkjet image forming apparatus 2000, when a printing operation start instruction is applied, a sheet such as sheet paper as a recording medium is fed from the sheet supply device 204. When the sheet is conveyed to the image forming unit 203, based on image information of a document ready by the image reading device 202 or print information instructed to print from a terminal, ink is ejected onto the sheet from a liquid discharge head 214 of the image forming unit 203, and an image is formed on the sheet.

The sheet formed thereon with the image is selectively guided to a conveyance path 222 passing through the drying device 206 or a conveyance path 223 not passing through the drying device 206. If the sheet is guided to the drying device 206, drying the ink on the sheet is accelerated by the drying device 206, and the sheet is guided to the sheet ejection unit 207 or the sheet aligning device 3000. On the other hand, if the sheet is guided to the conveyance path 223 not passing through the drying device 206, the sheet is directly guided to the sheet ejection unit 207 or the sheet aligning device 3000. If the sheet is guided to the sheet aligning device 3000, the sheet including a plurality of sheets is aligned and placed.

Figure 40:
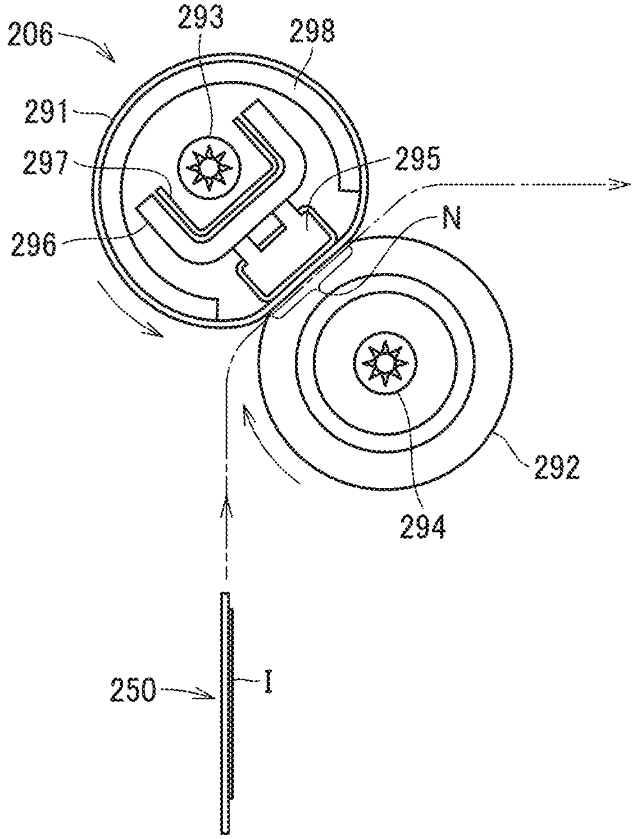
FIG. 40 is a diagram illustrating an example of a drying device.

As illustrated in FIG. 40, the drying device 206 includes a heating belt 291 serving as the first rotating body, a heating roller 292 serving as the second rotating body, a first heater 293 serving as a heating source that heats the heating belt 291, a second heater 294 serving as a heating source that heats the heating roller 292, a nip forming member 295, a stay 296 serving as the supporting member, a reflecting member 297, and a belt holder 298 serving as a rotating body holder that rotatably holds the heating belt 291.

The nip forming member 295 contacts an outer peripheral surface of the heating roller 292 via the heating belt 291 to form the nip portion N between the heating belt 291 and the heating roller 292. As illustrated in FIG. 40, when a sheet 250 that carries an image (ink I) is conveyed to the nip portion N of the drying device 206, the sheet 250 is heated and conveyed by the heating belt 291 and the heating roller 292 rotating in a direction indicated by an arrow in FIG. 40. As a result, drying the ink I on the sheet 250 is accelerated.

In the drying device 206 illustrated in FIG. 40, the heating belt 291 is rotatably held by the belt holder 298 including a pair of belt holders arranged in both longitudinal ends, and thus, when the heating belt 291 is heated and the temperature of the belt holders 298 rises, FPs/UFPs may be generated from the lubricant adhering to each belt holder 298. Therefore, when the present disclosure is applied to such a drying device 206, the temperature rise of the belt holder 298 is successfully suppressed, and the generation of FPs/UFPs is also successfully and effectively suppressed.

Figure 41:
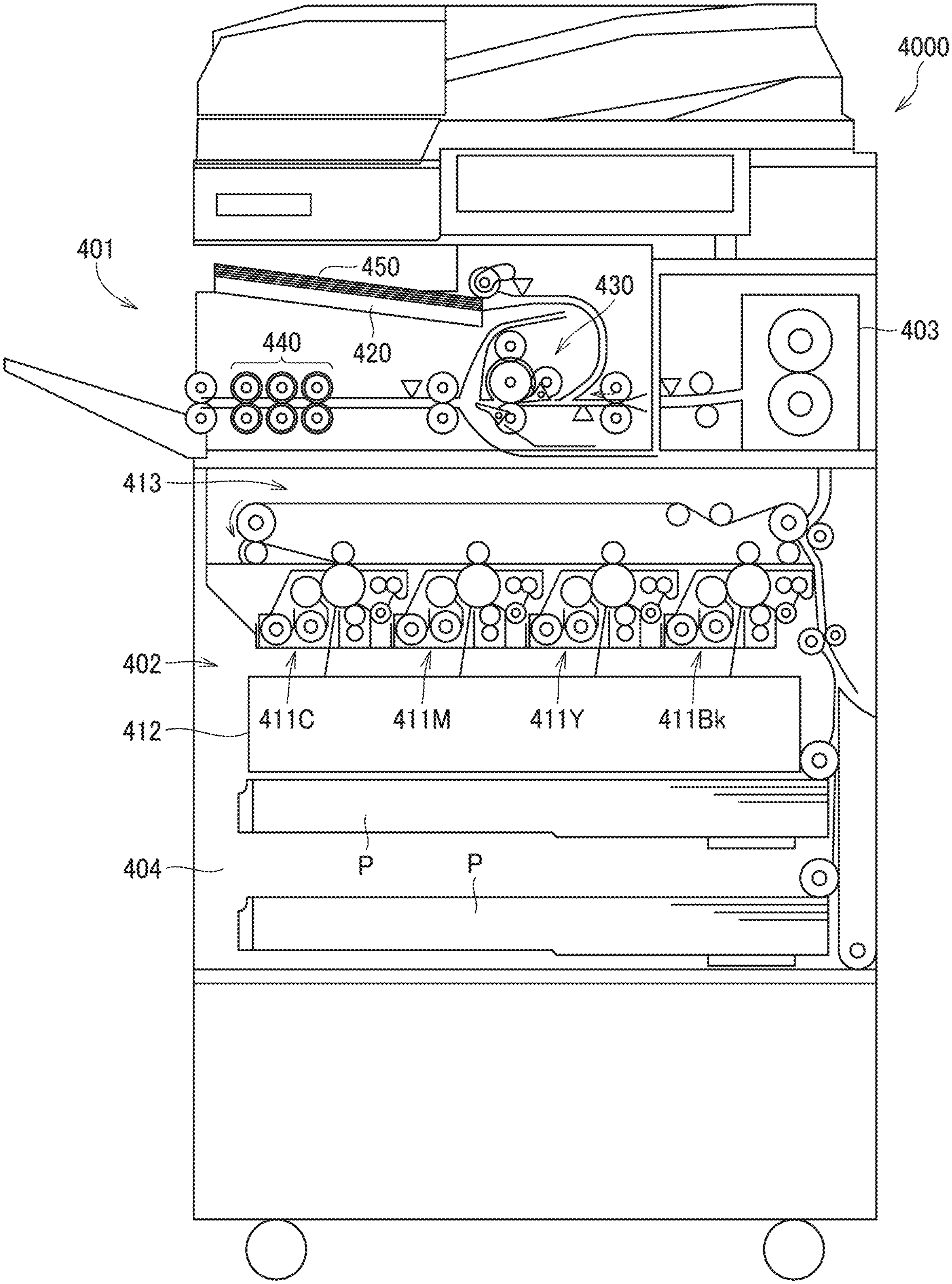
FIG. 41 is a diagram illustrating one form of an image forming apparatus including a laminating device.

It is possible to apply the present disclosure to an image forming apparatus including a laminating device as illustrated in FIG. 41.

An image forming apparatus 4000 illustrated in FIG. 41 includes not only a laminating device 401, but also an image forming unit 402 including a plurality of image formation units 411C, 411M, 411Y, and 411Bk, an exposure device 412, and a transfer device 413; a fixing device 403; and a sheet feeding unit 404 serving as a recording medium supplying unit.

The laminating device 401 is a heating device that heats and presses two sheets with sheet paper inserted therebetween apply thermocompression of the sheet to the sheet paper. Specifically, the laminating device 401 includes a sheet supply unit 420 that supplies a sheet 450, sheet peeling unit 430 that peels the sheet supplied from the sheet supply unit 420 into two sheets, and a heat pressure roller 440 serving as a rotating body that conveys the sheet paper and the sheet while heating and pressurizing the sheet paper and the sheet in a state in which the sheet paper is inserted between the two peeled sheets. The heat pressure roller 440 is heated by a heating source such as a heater. Both longitudinal ends of the heat pressure roller 440 are rotatably held by rotating body holders such as a pair of bearings.

In the image forming apparatus 4000 illustrated in FIG. 41, when the sheet paper P as a recording medium is supplied from the sheet feeding unit 404 to the image forming unit 402, an image is formed in the image forming unit 402, and the image is transferred to the supplied sheet paper P. The sheet paper P onto which the image is transferred is conveyed to the fixing device 403 to receive image fixing processing. It is noted that the image forming operation and the image transfer operation in the image forming unit 402 (each operation of the image formation units 411C, 411M, 411Y, and 411Bk, the exposure device 412, and the transfer device 413) and the fixing operation in the fixing device 403 are basically the same as those in the above embodiments, and thus, such operations are not described here.

The sheet paper P applied with the fixing processing is then conveyed to the laminating device 401 and inserted between the two peeled sheets. Next, the sheet paper P sandwiched between the two sheets is heated and pressed by the heat pressure roller 440, and the sheet and the sheet paper P are thermally pressed together and ejected out of the apparatus.

At this time, if the heat pressure roller 440 is heated by a heating source such as a heater to raise the temperature of the bearing that supports the heat pressure roller 440, FPs/UFPs may be generated from the lubricant adhering to the bearing. Therefore, when the present disclosure is applied also to the laminating device 401 including such a heat pressure roller 440, it is possible to suppress the temperature rise of the bearing that holds the heat pressure roller 440 and it is also possible to effectively suppress the generation of FPs/UFPs.

When some aspects of the present disclosure described above are summarized, the present disclosure includes a heating device, a fixing device, and an image forming apparatus including at least the following configurations.

First Configuration

In a first configuration, a heating device includes a rotating body held rotatably, a heating source to heat the rotating body, a rotating body holder holding both longitudinal ends of the rotating body, and a liquid or semi-solid lubricating substance adhering to the rotating body holder, in which a temperature of the rotating body holder is lower than a generation temperature of fine particles of the liquid or semi-solid lubricating substance.

Second Configuration

In a second configuration, a heating device includes a rotating body held rotatably, a heating source to heat the rotating body, a rotating body holder holding both longitudinal ends of the rotating body, and a liquid or semi-solid lubricating substance adhering to the rotating body holder, in which a temperature of the rotating body holder during continuous printing for 10 minutes is 210° C. or less.

Third Configuration

In a third configuration, in the heating device according to the second configuration, a temperature of the rotating body holder is 200° C. or less during continuous printing for 10 minutes.

Fourth Configuration

In a fourth configuration, in the heating device according to the second configuration, a temperature of the rotating body holder is 194° C. or less during continuous printing for 10 minutes.

Fifth Configuration

In a fifth configuration, in the heating device according to the second configuration, a temperature of the rotating body holder is 185° C. or less during continuous printing for 10 minutes.

Sixth Configuration

In a sixth configuration, in the heating device according to the second or third configuration, the liquid or semi-solid lubricating substance contains at least one of silicone oil or silicone grease.

Seventh Configuration

In a seventh configuration, in the heating device according to the fourth or fifth configuration, the liquid or semi-solid lubricating substance contains at least one of silicone oil, silicone grease, fluorine oil, or fluorine grease.

Eighth Configuration

In an eighth configuration, in the heating device according to any one of the first to seventh configurations, the heating source is disposed inside the rotating body holder.

Ninth Configuration

In a ninth configuration, the heating device according to any one of the first to eighth configurations includes a heat transfer suppression member to suppress heat transfer from the heating source to the rotating body holder.

Tenth Configuration

In a tenth configuration, in the heating device according to the ninth configuration, the heat transfer suppression member includes a first heat transfer suppression member disposed between the heating source and the rotating body holder, and a second heat transfer suppression member disposed between the first heat transfer suppression member and the rotating body holder.

Eleventh Configuration

In an eleventh configuration, in the heating device according to the tenth configuration, the first heat transfer suppression member and the second heat transfer suppression member are arranged in a non-contact manner with each other at least in a range where a heat generation portion of the heating source is arranged in a longitudinal direction of the rotating body.

Twelfth Configuration

In a twelfth configuration, in the heating device according to the tenth or eleventh configuration, the second heat transfer suppression member is disposed in such a manner that the second heat transfer suppression member does not directly contact the rotating body holder.

Thirteenth Configuration

In a thirteenth configuration, in the heating device according to any one of the tenth to twelfth configurations, the second heat transfer suppression member is a member having a thermal conductivity of 10 W/m·k or more.

Fourteenth Configuration

In a fourteenth configuration is the heating device according to the tenth or eleventh configuration, in which the second heat transfer suppression member is a member having a thermal conductivity of 0.05 W/m·k or less.

Fifteenth Configuration

In a fifteenth configuration, the heating device according to any one of the first to fourteenth configurations includes a cooling device to cool the rotating body holder, in which the cooling device is operated when the number of continuous prints reaches a predetermined number of prints.

Sixteenth Configuration

In a sixteenth configuration, the heating device according to any one of the first to fourteenth configurations includes: a cooling device to cool the rotating body holder; and a temperature detection member to detect a temperature of the heating device, in which the cooling device is operated when a detection temperature of the temperature detection member rises to reach a predetermined temperature.

Seventeenth Configuration

In a seventeenth configuration, in the heating device according to any one of the first to fourteenth configurations, a printing speed is reduced when the number of continuous prints reaches a predetermined number of prints.

Eighteenth Configuration

In an eighteenth configuration, the heating device according to any one of the first to fourteenth configurations includes a temperature detection member to detect a temperature of the heating device, in which a printing speed is reduced when a detection temperature of the temperature detection member rises to reach a predetermined temperature.

Nineteenth Configuration

In a nineteenth configuration, in the heating device according to any one of the second to seventh configurations, a printing speed during the continuous printing for 10 minutes is 50 pages per minute (ppm) or more.

Twentieth Configuration

In a twentieth configuration, a fixing device includes the heating device according to any one of the first to nineteenth configurations, in which the heating device is used to heat a recording medium bearing an unfixed image to fix the unfixed image on the recording medium.

Twenty-First Configuration

In a twenty-first configuration, an image forming apparatus includes the heating device according to any one of the first to nineteenth configurations or the fixing device according to the twentieth configuration.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A heating device, comprising:

a rotating body extending in a longitudinal direction;

a heating source configured to heat the rotating body;

a rotating body holder holding both longitudinal ends of the rotating body rotatably;

a lubricant of liquid or semi-solid adhering to the rotating body holder. and a shield including a shielding portion extending in the longitudinal direction into an interior the rotating body such that, within the interior the rotating body, the shield is between the heating source and the rotating body holder to maintain a temperature of the rotating body holder below a generation temperature of fine particles of the lubricant.

2. The heating device according to claim 1, wherein the heating source is disposed inside the rotating body holder.

3. The heating device according to claim 1, further comprising:

another shield between the shield and the rotating body holder in the interior of the rotating body, the another shield configured to reduce heat transfer from the heating source to the rotating body holder.

4. The heating device according to claim 3, wherein the shield and said another shield are arranged in non-contact with each other at least in a range where a heat generation portion of the heating source is arranged in the longitudinal direction of the rotating body.

5. The heating device according to claim 1, wherein said shield does not directly contact the rotating body holder.

6. The heating device according to claim 1, wherein the rotating body holder includes a side plate having a first thermal conductivity, and wherein the shielding portion of the shield has a second thermal conductivity different from the first thermal conductivity, the second thermal conductivity being 10 W/mk or more.

7. The heating device according to claim 1, wherein the rotating body holder includes a side plate having a first thermal conductivity, and wherein the shielding portion of the shield has a second thermal conductivity different from the first thermal conductivity, the second thermal conductivity being 0.05 W/mk or less.

8. A fixing device, comprising:

the heating device according to claim 1, wherein the heating device is configured to heat a recording medium bearing an unfixed image to fix the unfixed image on the recording medium.

9. An image forming apparatus, comprising:

the heating device according to claim 1.

10. The image forming apparatus according to claim 9, further comprising:

a cooling device configured to cool the rotating body holder; and control circuitry configured to cause the cooling device to operate in a case where a number of continuous prints reaches a predetermined number of prints.

11. The image forming apparatus according to claim 9, further comprising:

a cooling device configured to cool the rotating body holder;

a temperature sensor configured to detect a temperature of the heating device; and control circuitry configured to cause the cooling device to operate in a case where a detection temperature of the temperature sensor rises to reach a set temperature.

12. The heating device according to claim 1, wherein while the heating source heats the rotating body to a fixing temperature, the shield maintains the temperature of the rotating body holder less than the fixing temperature and less than a temperature the lubricant volatilizes to generates the fine particle.

13. A heating device, comprising:

a rotating body extending in a longitudinal direction;

a heating source configured to heat the rotating body;

a rotating body holder holding both longitudinal ends of the rotating body;

a lubricant of liquid or semi-solid adhering to the rotating body holder; and a shield including a shielding portion extending in the longitudinal direction into an interior the rotating body such that, within the interior the rotating body, the shield is between the heating source and the rotating body holder to maintain, a temperature of the rotating body holder during a continuous printing for 10 minutes to 210° C. or less.

14. The heating device according to claim 13, wherein the temperature of the rotating body holder during the continuous printing for 10 minutes is 200° C. or less.

15. The heating device according to claim 13, wherein the temperature of the rotating body holder during the continuous printing for 10 minutes is 194° C. or less.

16. The heating device according to claim 13, wherein the temperature of the rotating body holder during the continuous printing for 10 minutes is 185° C. or less.

17. The heating device according to claim 13, wherein the lubricant contains at least one of silicone oil or silicone grease.

18. The heating device according to claim 15, wherein the lubricant contains at least one of silicone oil, silicone grease, fluorine oil, or fluorine grease.

19. The heating device according to claim 13, wherein a printing speed during the continuous printing for 10 minutes is 50 pages per minute or more.

20. The heating device according to claim 13, wherein while the heating source heats the rotating body to a fixing temperature, the shield maintains the temperature of the rotating body holder during continuous printing for 10 minutes to 210° C. or less, which is less than the fixing temperature and less than a temperature the lubricant volatilizes to generates fine particle.

* * * * *